United States Patent
Varaiya et al.

(10) Patent No.: US 7,738,413 B2
(45) Date of Patent: Jun. 15, 2010

(54) MINIMIZING POWER CONSUMPTION IN A WIRELESS SYSTEM FOR A SENSOR NETWORKS USING TIME SLOTS FOR NODES

(75) Inventors: Pravin Varaiya, Berkeley, CA (US); Sinem Coleri Ergen, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 856 days.

(21) Appl. No.: 10/984,254

(22) Filed: Nov. 8, 2004

(65) Prior Publication Data
US 2005/0122231 A1 Jun. 9, 2005

Related U.S. Application Data

(60) Provisional application No. 60/528,145, filed on Dec. 8, 2003.

(51) Int. Cl.
*H04B 7/212* (2006.01)
*G08B 29/00* (2006.01)
(52) U.S. Cl. ...................... 370/321; 340/506
(58) Field of Classification Search ............ 340/531, 340/539, 506, 521; 455/574, 343.1; 370/390, 370/321
See application file for complete search history.

(56) References Cited

U.S. PATENT DOCUMENTS

| | | | |
|---|---|---|---|
| 5,982,813 A * | 11/1999 | Dutta et al. | 375/219 |
| 6,208,247 B1 | 3/2001 | Agre et al. | |
| 6,414,955 B1 * | 7/2002 | Clare et al. | 370/390 |
| 6,453,156 B1 * | 9/2002 | Center et al. | 455/161.3 |
| 7,019,639 B2 * | 3/2006 | Stilp | 340/531 |
| 7,020,501 B1 * | 3/2006 | Elliott et al. | 455/574 |
| 7,119,676 B1 * | 10/2006 | Silverstrim et al. | 340/531 |
| 7,161,926 B2 * | 1/2007 | Elson et al. | 370/338 |
| 7,277,414 B2 * | 10/2007 | Younis et al. | 370/338 |
| 2004/0078662 A1 * | 4/2004 | Hamel et al. | 714/22 |

OTHER PUBLICATIONS

Sinem Coleri, "PEDAMACS: Power Efficient and Delay Aware Medium Access Protocol for Sensor Networks," fall 2002, on Internet Dec. 20, 2002, in library Mar. 2003.
Sinem Coleri et al., "Power Efficient System for Sensor Networks," copyright 2003 IEEE, IEEE Computer Society.

* cited by examiner

*Primary Examiner*—George Eng
*Assistant Examiner*—Michael Faragalla
(74) *Attorney, Agent, or Firm*—Weaver Austin Villeneuve & Sampson LLP

(57) ABSTRACT

A power efficient system architecture that exploits the characteristics of sensor networks in order to decrease the power consumption in the network. The primary characteristic of sensor networks is that the destination of all the data packets in the network is a central data collector and this central data collector, which is usually denoted as access point (AP), has unlimited transmission power and energy whereas the sensor nodes have limited battery energy and transmission power. The system uses the AP to directly synchronize and explicitly schedule the nodes' transmissions over Time Division Multiple Access (TDMA) time slots.

19 Claims, 14 Drawing Sheets

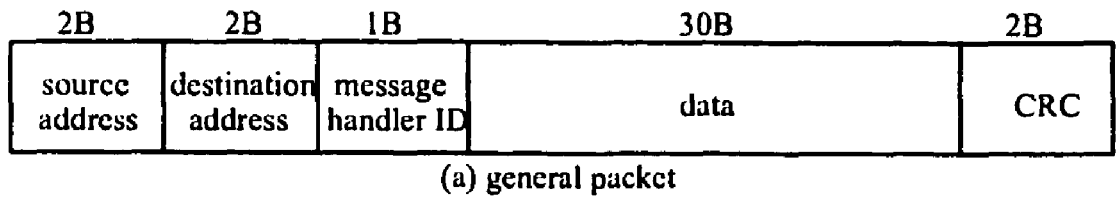
(a) general packet
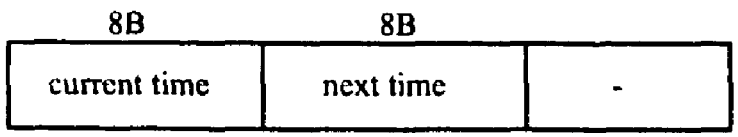
(b) topology learning, topology collection and adjustment coordination packets
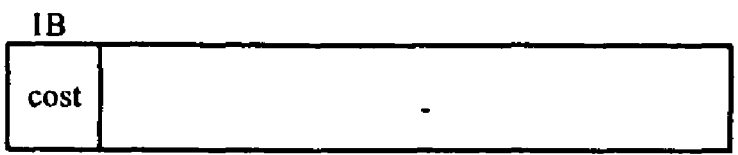
(c) tree construction packet
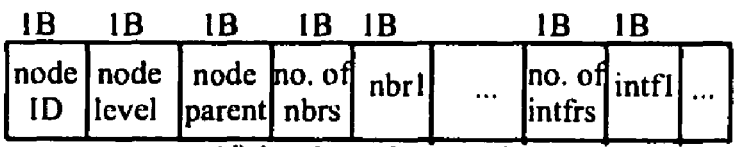
(d) local topology packet
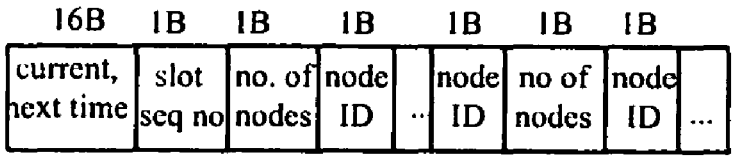
(e) scheduling packet
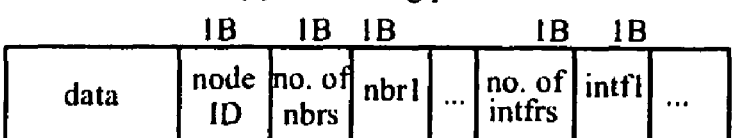
(f) data packet
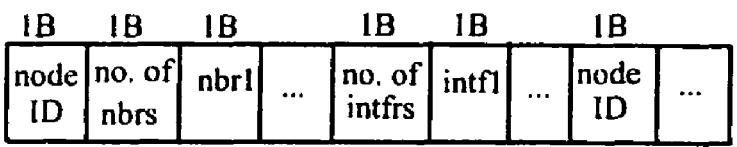
(g) adjustment topology packet
FIG. 3

*Input:* $(V, E, I, EC)$.
*Output:* $(VL, EL, IL, ECL)$.
  begin
    add node $v_1$ to $VL$
    $l = 2$
    while $l \leq levelOfTree$
      add node $v_l$ to $VL$
      add edge $(v_{l-1}, v_l)$ to $EL$
      If $\exists (u,v) \in I(EC)$ with $u$ at level $l$ and $v$ at level $j$ satisfying $j < l$
        add edge $(v_j, v_l)$ to $IL(ECL)$
      $l++$
  end

FIG. 5

*Input:* $VL = \{v_1, v_2, ..., v_N\}$, graph $GL = (VL, EL)$ with conflict graph $GCL = (VL, ECL)$.

*Output:* One color assigned to each node $\{(v_1, c_{v_1}), (v_2, c_{v_2}), ..., (v_N, c_{v_N})\}$ in which $c_{v_i} \in \{1, 2, , ..., M\}$ and $M$ is the number of colors.

begin
        for $l = 1$ to $N$
            $s = 1$
            while (there is a node conflicting with $v_l$ with color $s$)
                $s = s + 1$
            assign color $s$ to $v_l$
    end

FIG. 6

*Input:* $VL = \{v_1, v_2, ..., v_N\}$, graph $GL = (VL, EL)$ with conflict graph $GCL = (VL, ECL)$, one color assigned to each node $\{(v_1, c_{v_1}), (v_2, c_{v_2}), ..., (v_N, c_{v_N})\}$ in which $c_{v_i} \in \{1, 2, , ..., M\}$.

*Output:* Color assignment to each node such that each color corresponds to a maximal nonconflicting set.

begin
      for $s = 1$ to $M$
         for $i = 1$ to $N$
            if (no node with color $s$ conflicts with $v_i$)
               add color $s$ to the color set of $v_i$
   end

FIG. 7

*Input:* Graph $G = (V, E)$ with conflict graph $GC = (V, EC)$, color assignment of the corresponding linear network using $M$ colors.

*Output:* Transmission schedule for nodes of $G$.

begin
      while (at least one packet has not reached $AP$)
         for $s = 1$ to $M$
            $set_s$ = set of levels corresponding to color $s$
            $T = \emptyset$
            for $j = 1$ to $|set_s|$
                $T = T \cup \{$a nonconflicting set of nodes from level $j \in set_s$ with at least one packet$\}$
            assign current slot to set $T$, pass to next slot
            update the place of the packets
   end

FIG. 8

MINIMIZING POWER CONSUMPTION IN A WIRELESS SYSTEM FOR A SENSOR NETWORKS USING TIME SLOTS FOR NODES

CROSS REFERENCE TO RELATED APPLICATIONS

This application claims priority under 35 USC §119(e) from Provisional patent application Ser. No.: 60/528,145, filed Dec. 8, 2003, which is incorporated by reference herein for all purposes.

Attached hereto and incorporated by reference for all purposes are thesis of Sinem Coleri titled "PEDAMACS: Power Efficient and Delay Aware Medium Access Protocol for Sensor Networks, " Graduate Division of the University of California, Berkeley, Fall 2002 (Dec. 20, 2002); Coleri and Varaiya "Power Efficient System for Sensor Networks", Proceedings of the Eighth IEEE International Symposium on Computers and Communication 2003; Coleri Ergen and Varaiya "PEDAMACS: Power Efficient and Delay Aware Medium Access Protocol for Sensor Networks," (unpublished); Coleri Ergen and Varaiya "Scheduling Algorithm with Delay Guarantee for Sensor Networks," (unpublished).

BACKGROUND OF THE INVENTION

This invention relates generally to sensor networks such as used for example in traffic control, and more particularly the invention is directed to a power efficient system for communicating in sensor networks.

Wireless sensor networks is an emerging research area with potential applications in environmental monitoring, surveillance, military, health and security. Such a network consists of a group of nodes, called sensor nodes, each with one or more sensors, an embedded processor, and a low power radio. Typically, these nodes are linked by a wireless medium to perform distributed sensing tasks.

Many wireless sensor network applications require power efficiency, real-time guarantee, congestion control and fairness simultaneously. Examples of these are parking lot, traffic light, factory monitoring, fire detection, and security monitoring applications.

Wireless sensor networks can be used in parking lots to determine free spots and relay this information to a central data base or Access Point (AP) as shown in FIG. 1. Each parking spot contains one or more sensor nodes. These sensor nodes detect the presence of the car in their spot by using magnetic or acoustic sensor and then relay this information to AP. The AP provides information about vacant parking spaces. This application can save customers time and increase revenues with higher occupancy rates by eliminating turn-around areas and quick detection of vacant spaces. The primary requirement in this application is real-time delivery guarantee of packets so that the AP has up-to-date information about free spaces. Moreover, power efficiency is essential to decrease the maintenance cost of the system. Congestion control and fairness are important to get at least one packet from each parking space within a specific amount time.

A sensor network application at a traffic light involves adjusting the cycle time of traffic light based on the density of the cars behind lights, determined by using the sensor nodes as shown in FIG. 2. The number of cars passing through each node is calculated with the aid of a magnetic or acoustic sensor in the node. This information is periodically sent to the traffic light controller so that the controller can figure out the number of cars in each area and adjust the cycle time in the next round appropriately. This application requires real-time delivery guarantee with 30-60 sec, in order that the decision is optimal for the next round. Power efficiency is important to decrease the cost of the system. Congestion control and fairness are necessary to get the traffic information from each area of the road.

Machine diagnosis in an industrial setting is another use of a sensor network, in which energy constrained sensor nodes communicate to a single high-powered base station. This application again requires strict guarantee on the latency. Power efficiency and fairness decrease the maintenance cost of the system and provide information about each machine.

Fire detection and security monitoring are other applications of sensor networks with strict requirements. After deploying the sensor nodes in an area, the sensor network should be able to guarantee that the fire or security breach is detected and notified within a specific amount of time. Moreover, the company deploying this network should give a lower bound of at least 3-4 years on the lifetime of the system. Fairness should be satisfied in order to monitor every part of the area.

The basic feature of a sensor network that is different from traditional wireless ad hoc networks is that data traffic flow is from the sensor nodes to an access point (AP) that collects the data, rather than many independent point-to-point flows. Another important sensor network characteristic is that traffic generation at each node either has to be periodic or can be made periodic for robustness of the system. For instance, monitoring each spot in parking lot in order to lead the cars to empty spaces may require periodic packet generation at each sensor node. On the other hand, the sensor network deployed for fire detection needs packet generation only when there is a fire. However, if the network is not functional due to node failures, the AP will interpret this as having no fire. The periodic update of the fire condition by periodic generation of packets in the sensor nodes justifies the robust operation of the system.

The energy limitation of the sensor nodes due to their small size and long lifetime requirements imposes constraints on the protocol design. The primary source of energy consumption is the radio. Collision causes a packet to be corrupted by another packet. Since this packet is discarded, the energy consumption per successful transmission will increase. Idle listening occurs when the node consumes power listening to the channel for possible traffic even when there is no packet to be received on the channel. Overhearing occurs when a node consumes energy to receive a packet that is not destined to itself. Finally, control packets should be minimized to eliminate the energy consumption related to them. Since listening to the channel or receiving a packet may cost almost as much power as transmitting a packet, sensor nodes must only be awake to receive the packets destined to themselves or to transmit, and sleep otherwise in order to conserve power.

SUMMARY OF THE INVENTION

In accordance with the invention, a system for sensor networks is provided with the goal of achieving power efficiency in a robust and adaptive way. We combine the characteristics of cellular networks with those of ad hoc networks, based on the assumption that the AP has no energy constraint whereas the sensor nodes have limited energy. A mobile node is only a single hop away from the nearest AP in a cellular system whereas the nodes communicate over multiple hops in a short-range wireless ad hoc network. Our protocol uses the cellular idea in transmitting packets from the AP to sensor nodes and the ad hoc network idea while each node transmits its data packet to the AP. In the case when it is not possible for the AP to reach all the sensor nodes in the network in one hop, more than one AP can be assigned to the network so that together they cover all the nodes in the network.

In one embodiment, the system includes access points and sensor nodes that are in the transmission range of at least one access point. Each access point (AP) is used to coordinate a fraction of sensor nodes. The access point is assumed to be able to reach all the sensor nodes in its network in one hop since it is supposed to have a lot of energy and transmission power. However, it can also decrease its transmission range so as to help the sensor nodes determine their next hop in their route to AP. The path from the sensor nodes to AP is over multiple hops since sensor nodes have limited energy in the tree topology mentioned in.

The hardware of the sensor nodes is assumed to support adjusting the transmission power. The transmissions in our system are performed over three ranges. The longest transmission range belongs to the coordination packets of AP. The access point uses this range in order to reach all the sensor nodes in one hop and to directly control their transmissions. The shortest transmission range is used in the transmission of the data packets from sensor nodes to AP. This range must be chosen to be the lowest possible range that assures the connectivity of the network. The medium transmission range is used in the tree construction so as to learn the interferers of each sensor node, which are defined to be the nodes whose signal level is too weak to be decoded but strong enough to interfere with another signal.

In operation, the sensor network belonging to a particular AP can operate in one of four phases: the topology learning phase, the topology collection phase, the scheduling phase and the adjustment phase. During the topology learning phase, every node identifies its (local) topology information, i.e. its neighbors, interferers and parent node in the routing tree rooted at the AP obtained according to some routing metric. In the topology collection phase, each node sends this local topology information to the AP so that AP has complete topology information at the end of this phase. At the beginning of the scheduling phase, the AP broadcasts a schedule. Each node then follows the schedule: In particular, the node sleeps when it is not scheduled either to transmit a packet or to listen for one. The adjustment phase is included if necessary to learn the local topology information that was not discovered in topology learning phase or that changed, depending on the application and the number of successfully scheduled nodes in scheduling phase.

The topology learning phase is the phase during which each node identifies its interferers, neighbors and parent. The phase begins when the access node transmits a topology learning packet over the longest range in one hop to all sensor nodes that it is willing to coordinate. This packet includes the current time so that each node updates its time and synchronizes with each other and the incoming packet time so that every node will stop transmitting and listen for the next broadcast message of AP at this future time. Following this coordination packet, AP floods the tree construction packet over the medium range. This packet contains the cost of the transmitting node in the routing tree, e.g. minimum number of hops to reach AP. At the end of this phase, each sensor node decides the parent to be the next hop neighbor on the least cost path to the AP, the neighbors and interferers as the nodes with the received signal level above and below some interfering threshold respectively.

In this phase, a random access scheme has to be used since no node has any topology information. The random access scheme and its parameters should be chosen so that the nodes learn about all of their neighbors and interferers with high probability so that scheduling phase can be successful. The nodes listen to the radio for a random amount of time before transmitting and then transmit if the channel is idle. We have added a random delay before carrier sensing in order to further reduce the number of collisions.

The topology collection phase is the period at the end of which AP receives the complete topology information. The topology collection phase starts with the coordination packet of the AP named topology collection packet that is transmitted by the access point over the longest range at the time announced in the incoming packet time field of the topology learning packet. This packet contains current time field for synchronization and incoming packet time field for the next coordination packet broadcast time.

Following the coordination packet, each node transmits its topology packet containing its parent, neighbor, and interferer information to AP. Here again, CSMA scheme with some random delay before the transmission is used. However, this random access scheme alone is not expected to be successful since each collision will eliminate the topology information of at least 2 nodes. Therefore, in this case, acknowledgement is added to detect collisions and therefore retransmit the packets if necessary.

The scheduling phase is the phase during which each node is explicitly scheduled by AP based on the complete topology information obtained in topology collection phase. The scheduling frame is divided into time slots. We assume that the packet generated at each node has constant length and can be transmitted during one time slot. At the beginning of this phase, AP performs the scheduling of the sensor nodes in the network and announces the schedule of how all the traffic will be carried during the scheduling frame by broadcasting the schedule packet over the longest range. The schedule packet includes the transmitter information corresponding to each time slot in addition to current time and incoming packet time fields. At the beginning of the scheduling frame, each node generates one packet, which is then carried to AP according to the schedule.

For this phase, any scheduling algorithm that guarantees that the packets generated at each sensor node reach AP by the end of the phase will be appropriate. If the application requires real-time delay guarantee, then the algorithm given in the thesis of Sinem Coleri titled "PEDAMACS" University of California, Berkeley, Dec. 20, 2002, incorporated herein, can be used to guarantee a delay proportional to the number of nodes in the network.

The adjustment phase is included at the end of the scheduling phase to learn the complete network topology, detect the movement of the nodes or addition of new nodes as needed depending on the application. The adjustment phase begins when the AP broadcasts an adjustment coordination packet to all the sensor nodes over the longest range. This packet contains current time field for synchronization and incoming packet time field for the next coordination packet broadcast time.

Following the coordination packet, the nodes send adjustment topology packet that contains new topology information over the medium range if the channel is idle after waiting a random amount of time. If the nodes detect any new neighbors or interferers in this phase, they include this information in their data packets transmitted during the scheduling phase. They also include this information in their adjustment topology packets in the next adjustment phase so that the information is guaranteed to reach the nodes that can successfully send their data packets to the AP during the scheduling phase.

The AP then receives this information and checks and corrects the schedule if necessary.

The system performance is expected to improve as the proportion of the duration of scheduling phases to the total duration of topology learning, topology collection and adjustment phases increases. If the percentage of successfully scheduled nodes decreases below some threshold, which is predetermined depending on the application, for the latest scheduling frames, the topology learning phase or adjustment phase will follow the scheduling phase.

Our system can also deal with unsuccessful transmissions via redundancy instead of restarting topology learning phase or starting adjustment phase. When the degree of redundancy is n, n nodes are placed in a specific area in place of a single node, which would be the case when there is no redundant node in the network. We call these n nodes a redundancy group. After the determination of redundancy groups, only one node from each redundancy group is scheduled in each scheduling phase. If one of the nodes is not able to send its topology information to AP during the topology update phase or the topology information of a node is not correct, one of its redundant nodes will be scheduled. Redundant nodes also increase the overall lifetime of the system by putting their radio in sleep mode when they are not scheduled.

The invention and objects and features thereof will be more readily apparent from the following detailed description and appended claims when taken with the drawings.

BRIEF DESCRIPTION OF THE DRAWINGS

FIGS. 3A-3G illustrate packet structures as used in one embodiment of the invention.

FIG. 5 illustrates an algorithm for finding a linear network corresponding to an original network.

FIG. 6 illustrates the assigning of a color to specify permitted concurrent transmission by nodes.

FIG. 7 illustrates the assigning of a plurality of colors to each node in a linear network.

FIG. 8 illustrates a scheduling algorithm.

DETAILED DESCRIPTION OF THE PREFERRED EMBODIMENTS

Figure 1:
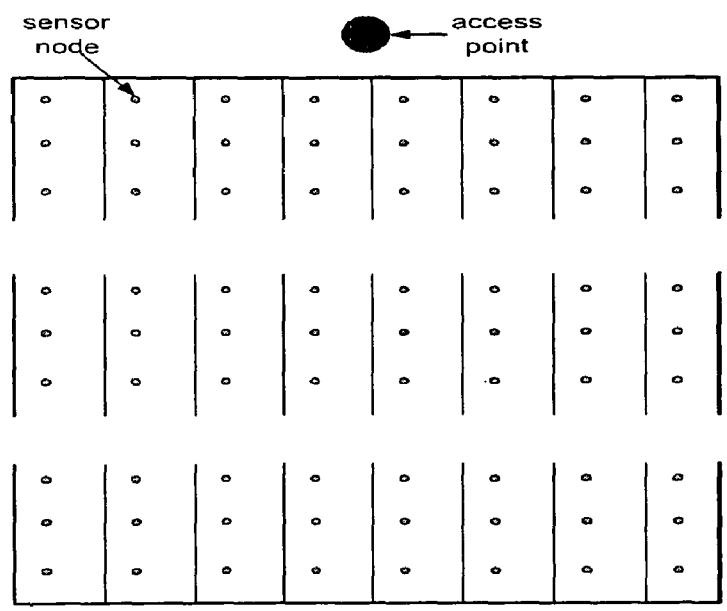
FIG. 1 illustrates a network of sensors with one access point for monitoring a parking lot.
Figure 2:
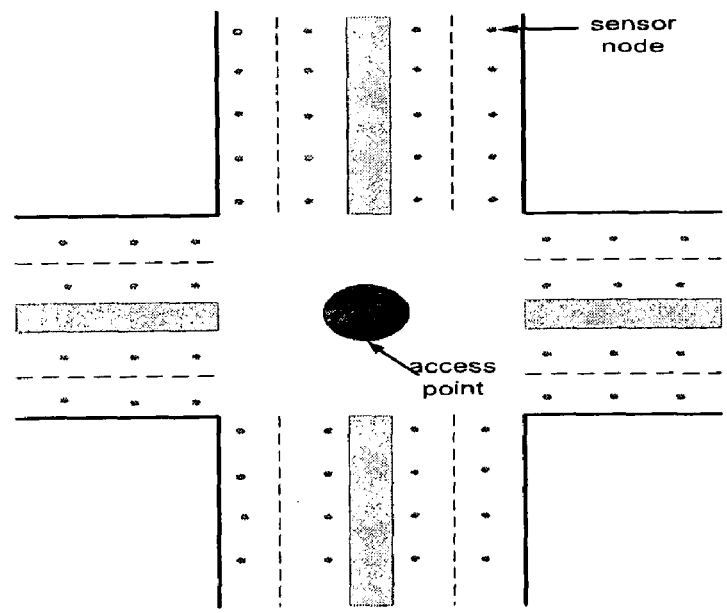
FIG. 2 illustrates a network of sensors with one access point for monitoring traffic at an intersection.

A wireless sensor network as employed herein includes a conventional group of nodes, each comprising one or more sensors, a processor, a radio, and a battery. An Access Point (AP) and a Sensor Node each includes a Transceiver, a Processor, and a Power Supply. A Sensor is included in the Sensor Node, also. Power is unlimited at the Access Point, but limited at the Sensor Node. Because of their low cost, small size, and wireless data transfer, these networks might be widely used in the future.

In a sensor network most of the battery energy is consumed by the radio. So the network's medium access control (MAC) protocol, which determines how the radios are operated, has a decisive influence on battery lifetime. Existing MAC protocols fall into one of two categories: random access and time division multiple access (TDMA). In contrast to random access networks, TDMA systems are more power efficient since they allow the nodes in the network to enter inactive states until their allocated time slots.

The system protocol aims at performing well in terms of all of the following metrics. Power efficiency—The radio is the biggest consumer of energy. Energy is wasted in collisions (requiring packet retransmission), idle listening (even when no packets are received), overhearing packets not intended for the listening node, and transmission of control packets that do not carry data.

Real-time guarantees—When data received by the access point are used to control a physical process, a guaranteed bound on the delay is necessary for effective control action. In transportation, for example, measurements of traffic at several locations on a freeway or at an urban street intersection are transmitted every 30 sec. to the access point on the side of the freeway or intersection. The access point, in turn, transfers the data to the traffic management center (TMC) over a phone line. For real time traffic control the data must be received at the access point within a prescribed time delay. Without a bound on the delay, the protocol may not be used.

Congestion control—Contention networks must control the packet generation rate at a node based on feedback from the network. The control ensures that nodes near the access point receive more bandwidth because they carry more traffic than other nodes. Congestion control affects both the delay and the power consumed per successful transmission. If traffic at a node exceeds the bandwidth allocated to it, packets will be dropped, wasting the energy consumed in bringing the packet to that node, and triggering delay-increasing retransmission.

Fairness—In each application, the packets are generated at a certain rate at each node. The MAC protocol should schedule the transmissions such that the transmission of none of the packets of a node is sacrificed for the sake of transmitting another node's packets. Random access is known to favor the transmission of the packets of the nodes closer to the AP more than their required bandwidth.

The following assumptions underlie this embodiment of the invention.

1. Consider a wireless ad hoc network that consists of one access point (AP) and several sensor nodes that generate data for transfer to the AP.

2. Sensor nodes are more static than nodes in a general ad hoc network. Although the system will perform better than previously proposed schemes in terms of energy consumption for the case of high mobility, it may fail to perform well in terms of delay.

3. Sensor nodes are capable of adjusting their transmission power.

4. The transmission power of all the sensor nodes are the same across the network although it may change over time. Consequently, links are bidirectional: If two nodes i and j transmit at the same power, then if node i can hear node j, node j can also hear node i. Bidirectional links are needed for the proper functioning of some network protocols such as distributed Bellman-Ford algorithms.

5. Nodes periodically generate data packets at a specific rate, which may be different for each node. The generalization of the protocol for event-driven data generation is described below.

6. The AP can reach all the sensor nodes (in one hop) since it is not energy or power limited. The path from a sensor node to the AP comprises several hops. The case where it is not possible to reach all the nodes with one AP is considered also.

7. Data generated at a node should be transmitted to the AP without data aggregation.

The network employs three transmission ranges. The longest range reaches all sensor nodes in one hop. The AP uses it to broadcast its coordination packets. The transmission power used by the AP to achieve longest range is denoted by P1. The AP can also decrease its transmit power to help the sensor nodes determine their next hop.

Sensor nodes use the shortest range to transmit data to the AP. The range should be as short as possible to minimize power consumption, while maintaining network connectivity. A sensor node also uses a medium transmission range to identify its interferers in addition to its neighbors, where neighbor is defined to be a node that can be reached at shortest range with an acceptable BER (bit error rate) and interferer is defined to be a node whose signal level is too weak to be decoded but strong enough to interfere with another signal when it transmits at shortest range. The transmission power used by the nodes to reach shortest range $r_s$ and medium range $r_m$ are $P_s$ and $P_m$ respectively.

The protocol operates in four phases: the topology learning phase, the topology collection phase, the scheduling phase and the adjustment phase. In the topology learning phase, each node identifies its (local) topology information, i.e. its neighbors and its interferers, and its parent node in the routing tree rooted at the AP obtained according to some routing metric. In the topology collection phase, each node sends this topology information to the AP so, at the end of this phase, the AP knows the full network topology. At the beginning of the scheduling phase, the AP broadcasts a schedule. Each node then follows the schedule: In particular, the node sleeps when it is not scheduled either to transmit a packet or to listen for one. The adjustment phase is included if necessary to learn the local topology information that was not discovered in topology learning phase or that changed, depending on the application and the number of successfully scheduled nodes in scheduling phase.

We now describe each phase in more detail. The appropriate packet structures are displayed in FIG. 3. The basic TinyOS packet has a 5-byte header, a 30-byte data payload, and a 2-byte CRC.

The topology learning phase begins when the AP broadcasts (using the longest transmission range) to all the sensor nodes a topology learning coordination packet. The packet includes current time and next time. All nodes synchronize with current time. They stop transmitting and listen for the next AP coordination packet at next time.

Following the topology learning coordination packet, the AP floods the network with the tree construction packet, using the medium range transmission. This packet contains the cost of the transmitting node in the routing tree, e.g. minimum number of hops to reach AP. Upon reception of a tree construction packet, a node first decides whether it comes from a neighbor or interferer based on the received signal strength according to its interference model. If the transmitting node is a neighbor of the receiving node and is the next hop on a path of smaller cost than previously learned paths, the receiving node updates this cost by including its own cost and rebroadcasts the tree construction packet. It also keeps this neighbor or interferer node information associated with its cost and received signal strength in an array. At the end of the flooding, it chooses its parent node to be the next hop neighbor on the least cost path to the AP.

Any interference model can be adopted in the system protocol. We illustrate one model. The condition for successful reception of packets is that signal-to-interference-and-noise ratio (SINR) is greater than a threshold, which depends on the acceptable BER, detector structure, modulation/demodulation scheme, and channel coding/decoding algorithm. On the other hand, SFNR depends on the channel, interference, antenna gain and transmission power. The SINR from node i to node j at shortest range is:

$$\text{SINR}_{ij} = \frac{P_{r,s}^{ij}}{I_j^i + \sigma^2} \quad (1)$$

in which $P_{r,s}^{ij}$ is power received at node j from the transmission of node i at transmission power $P_s$, $\sigma$ is the receiver thermal noise power and $$I_j^i = \sum_{k \neq i,j} P_{r,s}^{k,j}$$

is the interference power at node j from transmitters other than node i.

We assume that there is no interference beyond the medium transmission range, in contrast with the assumption of previously proposed TDMA protocols that no interference is caused beyond the shortest transmission range. Thus, the ratio $$\frac{P_m}{P_s}$$

can be chosen arbitrarily large compared to 1 in previous protocols. The larger the ratio, the higher the probability of correct reception of packets but the larger the delay the system experiences due to the increasing number of interferers in the system. The effect of this ratio on the delay and the number of data packets successfully reaching the AP is examined in herein below.

Since all interferers are assumed known and the reception power at medium range transmission $P_{r,m}^{ij}$ is related to that at shortest range transmission $$P_{r,s}^{ij} \text{ by } P_{r,s}^{ij} = P_{r,m}^{ij}\frac{P_s}{P_m},$$

the SINR from node i to node j at shortest range can be calculated by the following equation upon reception of the tree construction packet:

$$\text{SINR}_{ij} = \frac{P_{r,m}^{ij}\frac{P_s}{P_m}}{\sigma^2} \quad (2)$$

If $\text{SINR}_{ij} > \beta$ then nodes i and j are neighbors at the shortest range, otherwise they are interferers.

A random access scheme is used in the topology learning phase, because the nodes do not (as yet) have a transmission schedule. The scheme is designed so that, at the end of this phase, almost all nodes can correctly determine their neighbors and interferers with high probability. We adopt a carrier sense multiple access (CSMA) scheme similar to IEEE 802.11. The nodes listen for a random time before transmitting, and then transmit if the channel is idle. A random delay is added before carrier sensing to further reduce collisions.

The topology collection phase starts with a broadcast by the AP of the topology collection packet at the next time announced in the topology learning packet. This packet, too, contains both the current time (for synchronization) and the next time at which the AP will broadcast the next coordination packet.

Upon receiving the topology collection packet broadcast by the AP, each node transmits its local topology packet, listing the node's parent, neighbors, and interferers, to its parent using the shortest range transmission.

The topology collection phase also uses a CSMA scheme. However, because a collision will lead to the destruction of the local topology information of at least two nodes, the CSMA scheme by itself cannot guarantee that the AP will receive the full topology information. So the scheme is modified to include an implicit acknowledgement, which occurs when a node detects the transmission by its parent node to the latter's parent (packets from nodes at level 1 are explicitly acknowledged by AP, which retransmits all the packets it has received), or an explicit acknowledgement as in IEEE 802.11.

During the scheduling phase, the AP explicitly schedules all the nodes, based on its knowledge of the complete network topology. The scheduling frame is divided into time slots. A slot is larger than the packet duration by a guard interval to compensate for synchronization errors.

At the beginning of the phase, the AP broadcasts the scheduling packet. As with the other coordination packets, this packet contains the current time for synchronization, and the next time when the next coordination packet will be broadcast in addition to the schedule.

At the beginning of the scheduling frame, each node generates data packets, which are sent to the AP according to the schedule using the shortest transmission range. The data packets include the data that is to be sent to the AP and the new topology information that consists of the nodes and their neighbors and interferers discovered during the adjustment phase since the last topology learning and collection phases. If the packet length is not long enough to carry all new topology information, this information is included in a round robin fashion in each data packet. The length of the data field in the packet depends on the application.

The schedule determines the time slots when the nodes are allowed to transmit. When a node receives a packet, it does not attempt to transmit it immediately. Instead, it enqueues the packet and sleeps until the next scheduled time slot. The scheduling algorithm ensures that all packets reach the AP by the end of this phase. The algorithm used here can be based on the coloring of the original conflict graph or linearized version of the conflict graph.

The guard interval is assumed to be a small percentage of the total slot duration. Since the AP reaches all the nodes with the same packet, the error in synchronization from the delay between time-stamping and sending the packet at the transmitter is eliminated. Since the range of the AP is on the order of hundreds of meters, the propagation delay is also negligible. Based on the assumption that all the nodes run the same software, all the nodes timestamp the packet at the same time. Therefore, the only error of synchronization in this application comes from clock skew, which is defined to be the difference in the clock tick rates of the nodes. Typical clock drift of a sensor node in 1 sec is 10 μsec. If the packet generation period at each node is 30 sec, the maximum clock drift will be 0.3 msec compared to 14 msec, the duration of the packet transmission of 37 byte TinyOS packet at 50 kbps. Additional coordination packets can be transmitted by the AP between the beginning and end of the scheduling phase to decrease this guard interval even further.

Adjustment phase is included at the end of the scheduling phase to learn the complete network topology, detect the movement of the nodes or addition of new nodes as needed depending on the application. If the number of successfully scheduled nodes is not 100 percent, this means that some conflicting nodes may have been scheduled for the same slot during the scheduling phase due to incorrect topology information at the AP. However, restarting the topology learning phase may cause a delay for the packets of successfully scheduled nodes if the percentage of these nodes is not too low. The adjustment phase helps the protocol to update the schedule for small changes in the topology without restarting the topology learning phase. Another reason for the decrease in the percentage of successfully scheduled nodes may be the unstable links between the nodes and their parents. This can be handled by generating redundant data in the network or sending the data over multiple paths and is subject to future research.

The phase begins when the AP broadcasts to all the sensor nodes an adjustment coordination packet. The packet includes current time for synchronization and next time for the broadcast of the next coordination packet.

The backoff window size is calculated by subtracting the packet transmission time and guard interval from the length of the adjustment phase, which is equal to the difference between next time and current time. The nodes wait for a random time chosen from the backoff window size and transmit their adjustment topology packet that contains new topology information if the channel is idle. Meanwhile, they can receive other nodes' packets.

The adjustment phase uses medium transmission range to detect interferers and neighbors. If the nodes detect any new neighbors or interferers in this phase, they include this information in their data packets transmitted during the scheduling phase. They also include this information in their adjustment topology packets in the next adjustment phase so that the information is guaranteed to reach the nodes that can successfully send their data packets to the AP during the scheduling phase. The AP then receives this information and checks and corrects the schedule if necessary.

In scheduling, the network is represented by a graph G=(V, E), in which V is the set of nodes, including the access point AP. The (undirected) edges E ⊂ V×V are the (transmission) links to be scheduled. The graph forms a tree, rooted at AP. All traffic is destined for AP, so every data packet at a node is forwarded to the node's parent.

A node may interfere with another node, so these nodes should not transmit simultaneously. The interference graph C=(V, I) is assumed known (at the beginning of the scheduling phase). Here I ⊂ V×V is the set of edges such that (u, v)∈I if either u or v can hear each other or one of them can interfere with a signal intended for the other (even if they cannot hear each other). So, if u is transmitting, v should not be scheduled to receive from another node at the same time. I therefore consists of the links between each node and its neighbors and interferers except the node's parent.

The conflict graph corresponding to G=(V,E) and C=(V, I) is the graph GC=(V,EC) in which EC comprises the edges between node pairs that should not transmit at the same time. EC contains two kinds of edges. First, if (i,j)∈E, (i,j)∈EC, because a parent node and a child node cannot transmit at the same time. Second, if (i,j)∈I or (i,j)∈E and $c_j$ is a child of j in G, (i, $c_j$)∈EC: Because i and j interfere, if i is transmitting, the child $c_j$ of j cannot transmit at the same time because j would hear from both i and $c_j$.

A scheduling frame is defined to be the time duration that starts when each node has generated exactly one packet and ends when all these packets have reached AP. It is divided into time slots. A slot is long enough to transmit one data packet plus a guard interval to compensate for synchronization errors. A schedule assigns one or more time slots to each edge in E. A node u may receive a packet from its child v during a time slot assigned to (u,v)∈E or to node v since its parent u is already known. We use the following notation: The distance d(u,v) between nodes u and v is the number of edges in the path between them in G; and a node u is at level k if it is at distance k from AP in G.

Each node of G (except AP) generates one packet at the beginning of the scheduling frame. Given the interference graph C, the scheduling problem is to find a minimum length frame during which all nodes can send their packets to AP.

Theorem 1 The scheduling problem is NP-complete.

Figure 4:
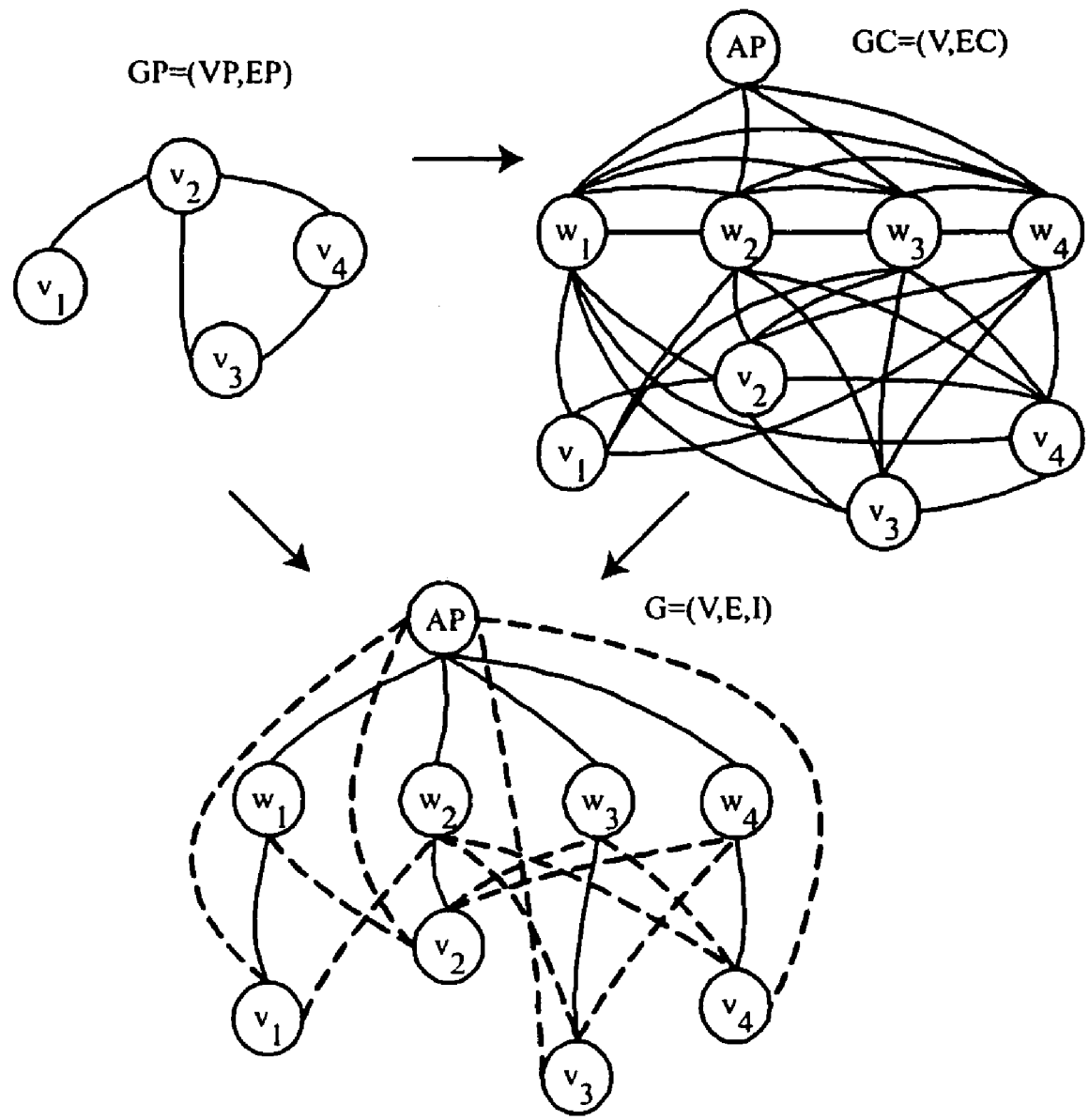
FIG. 4 illustrates transformation to a tree network in scheduling.

Proof We reduce the NP-complete problem of finding the chromatic number of a graph to the scheduling problem. Let GP=(VP,EP) with VP={$v_i$, ... ,$v_N$} being an instance of a graph whose chromatic number we want to find. We first construct a conflict graph GC=(VEC). First, GC includes all the nodes and edges of GP. Next, for each node $v_i$, add another node $w_i$. Then add edges ($w_i$, $w_j$),($v_i$, $w_j$)∈EC for all i,j. Lastly add another node AP and edges (AP,$w_i$) for all i. See FIG. 4.

The conflict graph GC is such that if wi is active, none of the nodes in V\{$w_i$} can be active at the same time. Also, if $v_i$ is active, none of the nodes $w_j$ or the conflicting nodes from V, determined by the edges EP, can be active.

We now construct a tree G=(VE) and an interference graph C=(V,I) whose conflict graph is GC=(V,EC). The edges of the tree are E={(AP,$w_i$),($w_i$, $v_i$)|1≤i≤N}.

Because AP is a parent of $w_i$, ($w_i$,AP)∈EC for all i; moreover ($w_i$,$w_j$)∈EC for all i,j, because they have the same parent, AP. And ($v_i$,$w_i$)∈EC because $w_i$ is the parent of $v_i$.

Let I consist of edges ($v_i$,AP) for all i, and ($v_i$,$w_j$),($v_j$,$w_i$), whenever ($v_i$,$v_j$)∈EC. Since ($v_i$,AP)∈I and ($w_j$,AP)∈E, ($v_i$,$w_j$) ∈EC for all i,j. Lastly, if ($v_i$,$w_j$)∈I and ($v_j$,$w_i$)∈I, i≠j, ($v_i$, $v_j$)∈EC because the parent of one of them is interfered by a transmission of the other. Thus GC is indeed the conflict graph corresponding to the tree graph G and interference graph C.

Consider the minimum schedule length for GC such that each node $v_i$,wi, 1≤i≤N, has one packet destined for AP. A packet in $w_i$ takes the path ($w_i$, AP) and a packet in $v_i$ takes the path ($v_i$,$w_i$,AP). Because each wi conflicts with the nodes $w_j$, j≠I and all nodes $v_i$, it takes N slots to transmit the packets generated at level one to AP, independently of the rest of the network. Also, when the N packets from level two arrive at level one, it takes another N slots to forward them to AP.

Thus to minimize the time to transmit all packets to AP, we must minimize the time to transmit the packets from level two to level one. But the conflict graph at level two is determined by the original graph GP, so the minimum scheduling time is exactly 2N+c, where c is the chromatic number of the original graph GP.

Theorem 2 The minimum schedule length is at least |V|−1 and at most $$\frac{1}{2}(|V|-1)|V|,$$

where |V| is the number of nodes in V.

Proof AP can receive at most one packet in each slot, so at least |V|−1 slots are needed for all packets to reach AP. This gives the lower bound. The worst interference graph is complete: Transmission from any node interferes with all other nodes. In this case at most one packet may be transmitted (within the network) in one slot. In the worst case of a 'linear' network (in which each parent has at most one child), the total number of hops through which all the packets must travel is $$1+2+\ldots+|V|-1=\frac{1}{2}(|V|-1)|V|.$$

The scheduling problem is complex because many subsets of non-conflicting nodes are candidates for each time slot, and the subset selected for transmission in one slot affects the number of transmissions in the next time slot, as some schedulable nodes may not have any packets to transmit because of the subset selected in the previous slot.

Traditional TDMA algorithm, upon learning the graph G=(VE) and the conflict graph GC=(VEC), colors GC. Based on the definition that a superslot contains all these colors, each node is activated once during each superslot. Instead of this traditional TDMA algorithm, we propose a polynomial-time algorithm that is shown to perform better than a traditional TDMA schedule on average. The advantage of the algorithm over a TDMA schedule is that it considers the increased data flows closer to the AP by activating each level of the tree once in each TDMA superslot based on the coloring of a linear network equivalent of the original graph. It also guarantees a bound on the length of the scheduling frame which is shown to be less than that of TDMA schedule. The sensor scheduling algorithm has three parts. In the first part, we obtain a linear network GL=(VL,EL) with interference graph CL=(V L, IL) resulting in conflict graph GCL=(VL, ECL) corresponding to the original network. In the second part, we color this linear network so that the nodes with the same color form a maximal independent set of GCL. In the third part, we schedule the links in the original network, (u, v)∈E, based on the coloring of the linear network.

Obtaining the linear network. If the original tree network has depth N, the linear network GL=(V L,EL) has nodes VL={$v_1, \ldots, V_N$} with node $v_l$ corresponding to all nodes at level l in the original network and edges ($v_i$, $v_i$+1)∈EL for 1≦i≦N. The interference graph CL=(VL, IL) includes edge ($v_j$, $v_l$) if there is an interference edge between a node at level j and a node at level l in the original network for j, l≧1. The resulting conflict graph GCL=(VL,ECL) then includes edge ($v_j$, $v_l$) if the transmissions of a node at level j and a node at level l conflict in the original network for j, l≧1. FIG. 5 gives the algorithm to find the corresponding EL, CL and ECL. The running time of the algorithm is $O(|V|^2)$.

Coloring the linear network: We now color the linear network so that two nodes with the same color can transmit at the same time. The algorithm has two phases. in the first phase, FIG. 6, one color is assigned to each node. The second phase, FIG. 7, guarantees that nodes containing the same color form a maximal non-conflicting set by checking all the nodes for each color to see whether the nodes can also be assigned this color.

Phase I assigns a slot to node i in O(i) steps, so the running time of this algorithm is $O(|V|^2)$. The running time of phase II is $O(|V|^2 M)$, if M colors are used.

Scheduling the original network. If nodes $v_i$, $v_j$ in the linear network are assigned the same color, they do not interfere, and can transmit at the same time. By construction of the linear network, there is also no interference between nodes at levels i and j in the original network and so any two nodes one chosen from level i and the other from level j can also transmit at the same time.

A superslot is a collection of consecutive time slots such that each level of the tree with at least one packet at the beginning of the superslot forwards at least one packet to the lower level during the superslot. Because two nodes at different levels assigned the same color can transmit at the same time, the number of slots in a superslot is at most equal to the total number of colors used for coloring the linear network. After determining the levels corresponding to the current time slot from the coloring of the linear network, a non-conflicting set of nodes at these levels, which have packets to transmit, are selected for transmission. This non-conflicting set may just contain one node or any group of nodes as long as they do not contain any edge belonging to the conflict graph GC between them.

The algorithm is given in FIG. 8. If one node is chosen from each level corresponding to the slot of each color, the running time of the algorithm is O(l), where l is the number of slots in scheduling frame.

Figure 9:
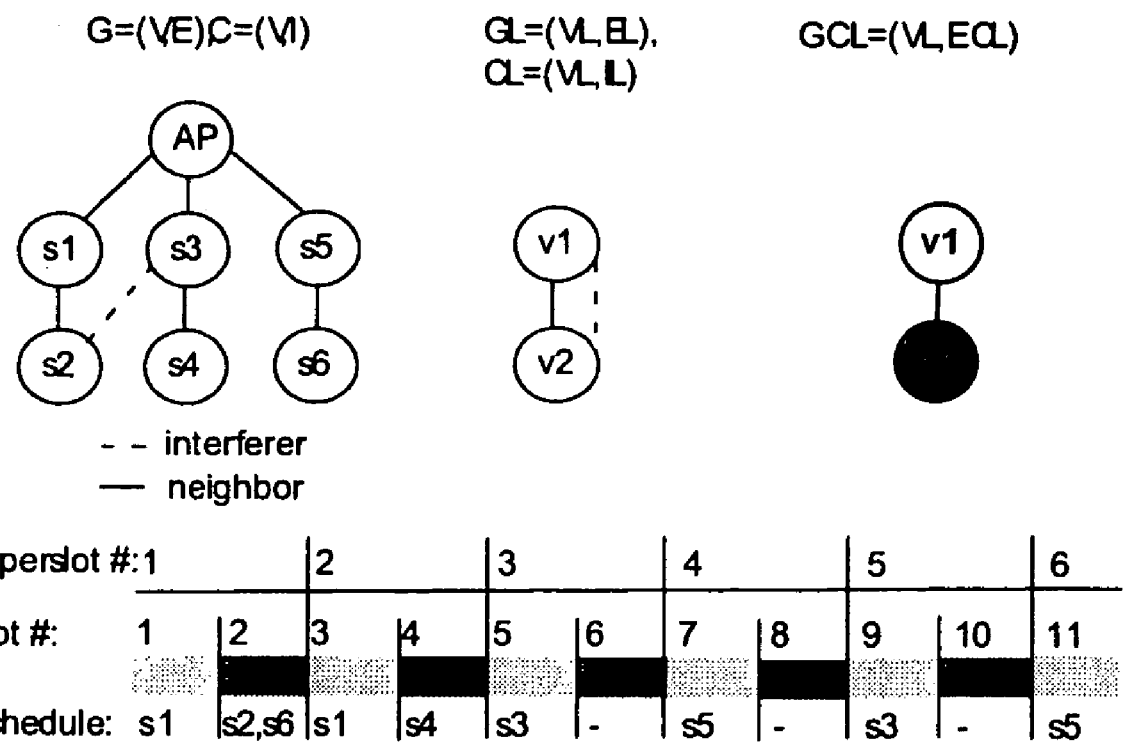
FIG. 9 illustrates schedule generation of a sensor TDMA.

FIG. 9 illustrates the scheduling algorithm for an example network.

Case 1: The tree graph G=(V,E) is linear, that is each node u∈V has at most one child. The interference graph C=(V, I) is such that I=∅.

Case 2: The tree graph G=(V,E) is general. The interference graph C=(V, I) satisfies the ancestor property, that is, there do not exist u, v, b such that (u, v)∈I and |d(u, b)−d(v, b)|>1. This represents the case where shortest path routing is used with the cost of each path being equal to the number of nodes on that path and only nodes that can hear each other can interfere, which is the assumption of previously proposed TDMA scheduling algorithms.

Case 3: The tree graph G=(V,E) is general and the interference graph C=(V, I) is such that the maximum difference between the levels of two interfering nodes is K.

Case 4: The tree graph G=(V,E) and the interference graph C=(V, I) are both general.

Theorem 3 In cases 1 and 2 the maximum length of the frame is 3|V|−3 time slots; in case 3 it is (K+2)(|V|−1); and in case 4 it is α (|V|−1), in which a is the number of colors used in the linear network corresponding to G.

Proof Case 1. If the tree graph G is linear and the interference graph C satisfies I=∅, the corresponding linear tree interference graph CL also satisfies IL=∅. It is easy to see that this linear tree can be colored optimally with three colors when the number of levels is more than two. The colors are assigned in a round robin fashion starting with the node one hop away from the root, AP.

At the beginning of the frame, each node has exactly one packet. In the first superslot, one packet is transmitted from any level to the next lower level. Because each node is a parent of one node except for the node at the highest level |V|−1, it also receives one packet during the superslot. Thus, at the end of the first superslot, each node at level less than |V|−1 has exactly one packet to transmit, the node at level |V|−1 has no packet, and each node has transmitted exactly one packet during the superslot. This means that at the end of the first superslot, each packet has moved by one hop and one packet has reached to the final destination AP.

In the same way, at the beginning of the second superslot, each node at level less than |V|−1 has one packet to transmit, and at the end of the second superslot, each packet has moved by one more hop, there are no more packets at levels greater than or equal to |V|−2 and the node AP has received exactly one packet. Continuing in this manner, at the end of (|V|−1) superslots, all packets will have reached the final destination AP.

The maximum number of time slots in each frame is at most the product of the maximum number of slots in each superslot and the maximum number of superslots necessary for all packets to reach the destination AP, namely 3(|V|−1).

Case 2. Because the interference graph of the tree network satisfies the ancestor property, the corresponding linear tree interference graph CL satisfies IL=∅. It can therefore be colored optimally with 3 colors.

First assume that we select exactly one node to transmit from each level (of the original tree graph G=(VE)) corresponding to the color of the slot. At the beginning of the frame, each node has one packet. In the first superslot, one packet is transmitted from each level to the next lower level. Except at the highest level, each level receives one packet. Therefore, one packet has moved one hop closer to the AP at each level, one packet from level one has reached AP, and nodes at the level of the depth of the tree may have no more packets.

At the end of the second superslot, the number of packets transmitted from one level to one lower level is again one except, possibly, for level depth. Each level less than depth-1 has one packet to transmit, while nodes at levels depth or depth-1 may have exhausted all packets. Continuing in this manner, by the end of i-th superslot, there are no more packets above some threshold level, and there is at least one packet at levels lower than this threshold. Since each level below the threshold is guaranteed to have a packet, and all levels with at least one packet can transmit once in each superslot, one packet reaches AP in each superslot. Therefore, the number of superslots required for all packets to reach AP is |V|−1. Since there are three slots in each superslot, the maximum frame length is again 3(|V|−1).

The scheduling algorithm allows a subset of non-conflicting nodes (instead of a single node) at each level to transmit so the resulting frame length will also be at most $3(|V|-1)$.

Case 3. The worst case is when there is an interfering edge between a node at level j and every node at level i with $|i-j| \leq K$. The corresponding linear graph can be colored by K+2 colors in that case.

Assign color 1 to $v_l$. The color of the nodes $\{v_2, \ldots, v_{k+2}\}$ cannot be 1. Assign the smallest color, 2, to node $v_2$. The color of $\{V_3, \ldots, v_{k+3}\}$ cannot be 2. Assign the smallest color, 3, to $v_3$. Continuing in this way, $v_{k+2}$ is assigned color K+2. Node $v_{K+3}$ is assigned color 1, since its color is restricted not to be $2, \ldots, K+2$. Thus, the algorithm colors this network with K+2 colors in a round robin fashion with color 1 assigned to $v_l$. The interference of any other network is a subset of this worst case.

The same reasoning as in Case 2, now indicates that at least one packet reaches AP in each superslot. So the number of superslots needed is at most $|V|-1$. Hence the frame length is at most $(K+2)(|V|-1)$ time slots.

Case 4. The number of superslots required for all packets to reach AP is the number of packets in the network, which is $|V|-1$. The maximum number of slots in each superslot is the number of colors, $\alpha$. The upper bound on the frame length is then $\alpha (|V|-1)$.

In traditional TDMA algorithms, the original conflict graph GC is colored instead of GCL. Let $\alpha$ be the number of colors used in coloring GC. Then the maximum length of the frame is $\alpha (|V|-1)$.

Up to now, we have assumed that there is only one AP in the network and every sensor node periodically generates data at the same rate for transfer to the AP. The system framework, however, is quite flexible and can be generalized in many ways. Following is a generalization of the algorithm to handle periodic data generation at different rates, non-periodic data generation and existence of more one AP.

Consider the sensor network where all the nodes generate data packets periodically at possibly different rates to be transferred to an AP.

Let us represent the network by the graph $G_d=(V_d,E_d)$ and conflict graph $GC_d=(V_d, EC_d)$. The scheduling frame starts when each node $i \in V_d$ has generated $g_i$ packets and ends when all packets have reached AP.

Given $G_d$ and $GC_d$, the scheduling problem is to find a minimum length frame during which all nodes send their packets to the AP. The problem is NP-complete since the scheduling problem proved to be NP-complete in Theorem 1 is a special case where $g_i=1$ for all $i \in V_d$.

We find a schedule for this problem by providing an algorithm that takes the tree graph $G_d=(V_d,E_1)$ with conflict graph $GC_d=(V_d,EC_d)$ and generation rate $g_i$, $i \in V_d$ and obtains a graph $G=(V,E)$ with conflict graph $GC=(V,EC)$ and generation rate 1 at each node $i \in V$. Then the schedule for G maps directly to a schedule for $G_d$.

For each $i \in V_d$, there are $g_i$ corresponding nodes in V. Denote them by $n_i^k$, $k \in [1, g_i]$. If i is the parent of j in $G_d$, then $(n_i^l, n_j^l) \in E$ for $l \in [1, g_j]$. The resulting graph $G=(V,E)$ is a tree where nl/i is used to forward all the incoming packets to node i.

EC contains two kinds of edges. First, if $(i,j) \in EC_d$, then $(n_i^k, n_j^l) \in EC$ for all $k \in [1, g_i]$ and $l \in [1, g_j]$, because nodes i and j cannot transmit at the same time. Second, $(n_i^k, n_i^l) \in EC$ for all k, $l \in [1, g_i]$, $k \neq l$ for all $i \in V_d$, because $n_i^k$ and $n_i^l$, $k \neq l$, represent the same node i and the slot duration is only long enough to carry one packet of node i.

The schedule for G maps directly to a schedule for $G_d$. If $n_i^k$ for any $k \in [1, g_i]$ is assigned to a slot in the schedule for G then assign node i to that slot in the schedule for $G_d$. The resulting schedule is valid since none of the conflicting nodes or the nodes corresponding to the same node are assigned to the same slot and the routing of packets is as given in $G_d$.

Notice that $GL_d=GL$ and $GCL_d=GCL$. The maximum length for the schedule is then the product of the number of colors used to color the linear network corresponding to $G_d$ with $GC_d$ and the number of packets in $G_d$, $$\sum_{i \in} v_d g_i.$$

Consider the sensor network where the nodes generate data packets to be transferred to an AP only upon the existence of an event such as fire, security breach. This network can still use TDMA scheduling with slight changes on the use of time slots assigned to each node.

The main idea of extending the scheduling algorithm for periodic data generation to event-driven sensing applications is that the slots assigned to the nodes do not have to be used. When there is no event, the nodes only wake up to check whether there is any transmission in the slots they are assigned to receive a packet. During these slots, they only listen to the channel for the duration of the guard interval plus the length of preamble. If there is a packet, they continue to listen, otherwise they put their radio back in sleep mode. When there is an event, they use their assigned slot to transmit their own packet and the other nodes forward their packets even if they do not detect any event.

Consider a sensor network where there are more than one AP and every sensor node periodically generates data for transfer to any of the APs. Including more than one AP in the system increases the coverage of the network and brings scalability to the system.

The set of non-conflicting APs are defined to be the APs sufficiently separated such that their packets and the packets of the sensor nodes inside their range do not interfere. Determining these APs is the same problem as assigning frequencies in cellular radio systems.

The scheduling algorithm at each AP should take into account the interference from the neighboring cells. Only the non-conflicting APs can be assigned the same color to transmit their packet. The APs assigned to the first color then color the linear network corresponding to their network, finds the schedule and broadcast this information to sensor nodes and neighboring APs. Neighboring APs with the next color assign the same color to the levels of their network containing a common node, which is defined to be a node inside the range of both APs, and assign a different color to the levels containing an interferer of a specific color. They also pre-assign the common nodes to the slots they are already assigned by their neighboring AP. Then they color the remaining linear network and assign each slot a non-conflicting set of nodes according to the scheduling algorithm. The APs corresponding to each color consider the schedules of the APs of the previous colors in this way.

Let the maximum number of colors used in coloring the linear network corresponding to each AP be $\alpha$. If the linear network coloring of an AP uses less number of colors then all nodes except possibly common nodes inside its network sleep during the remaining slots. Since the network connected to an AP may have to wait for the scheduling of the common nodes if the rest of the nodes at the same level interfere with these nodes, the maximum number of the extra slots included for the neighboring APs is the total number of packets that must be forwarded by these common nodes times the number of colors. Let us call the number of these packets x. Then the maximum duration for the total schedule length for an AP is $\alpha(|V|+x-1)$. Since the value of x only depends on the neighboring APs not all APs, the schedule length is scalable.

The purpose of our simulation is to show the effectiveness of PEDAMACS protocol by examining each phase separately, to compare it with protocols having different energy conserving features in terms of delay and energy consumption, and to analyze the effect of interference on the performance of the protocol.

The simulation environment is TOSSIM, a discrete event simulator for TinyOS, the operating system developed for the Berkeley sensor nodes. TinyOS and TOSSIM are not described here. We note that TOSSIM is a bit level simulator, which is better suited to the analysis of MAC protocols than a packet level simulator. Another advantage is that the TOSSIM simulation compiles directly from the TinyOS code used to implement the protocol.

In the simulations the nodes are randomly distributed in a circular area of radius 100 units. The transmission range is chosen to be slightly larger than the threshold necessary for connectivity of the network. The results discussed below are averages of the performance of ten different random configurations unless otherwise stated.

The window sizes and the delays are given in units of bit time—the radio tick period, so the absolute time delay for any data rate is the product of the number of bit times and the radio tick period. The sensor network lifetimes are estimated for a 50 kbps transmission rate.

Shortest path routing is used in the simulations. To get an idea of the resulting trees, the average depth of the resulting routing trees is 4.4, 5.2 and 7 for 20, 30 and 60 nodes respectively; correspondingly the average number of neighbors is 4.6, 5.0 and 5.5. The data packet length is 37 bytes whereas control packet length is 10 bytes. The schemes assume that $$\frac{r_m}{r_s} = 1$$

unless otherwise stated to make a fair comparison between the existing protocols that do not take interference into account.

In the topology learning phase, a random access scheme is used because the nodes do not (as yet) know their topology information. Upon reception of a tree construction packet, a node decides to rebroadcast it if it is coming from the shortest path.

Before transmitting a packet, the node waits for the channel to be idle for a certain time randomly chosen from the backoff window size. The backoff window size is chosen large enough to create a phase difference between the packet transmissions. The node then chooses another random listening time from listening window size and decreases it by 1 at each radio clock tick, generated at the transmission rate (e.g. 50 kbps), as long as the channel is idle for the last Inter Packet Interval (IPI) time (corresponding to the Inter Frame Space (IFS) in 802.11). The listening window size is chosen large enough to avoid the collisions. The node starts to transmit when the listening time decreases to 0. Meanwhile, the node can receive another packet and return to the same state it has left.

Figure 10:
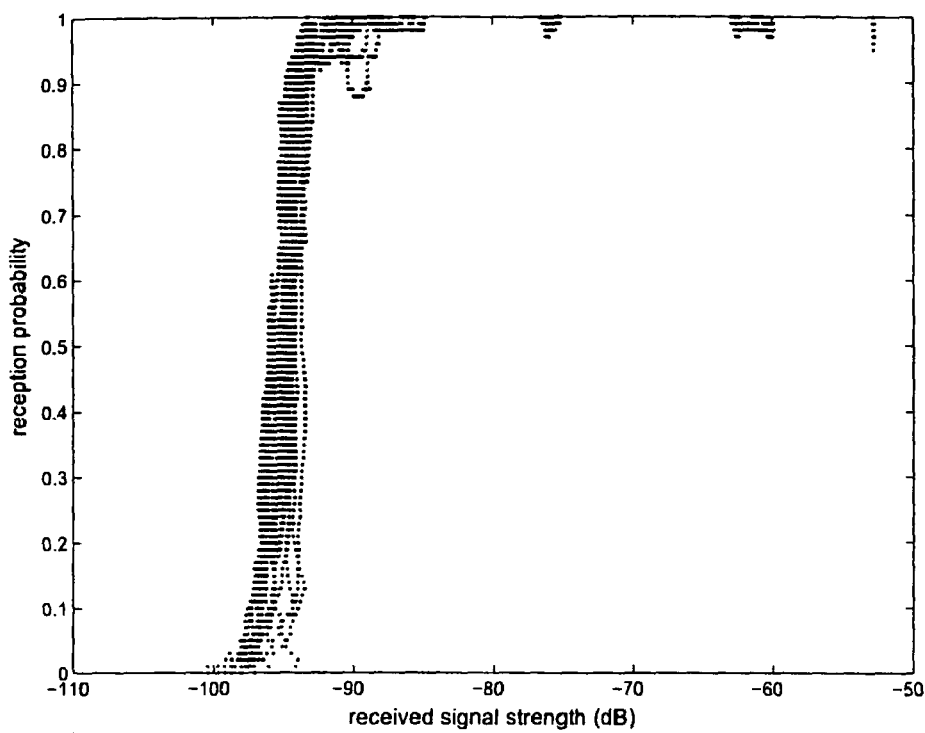
FIG. 10 is a graph of reception probability versus received signal strength.

Since the nodes are to be scheduled without retransmission during the scheduling phase, we want the links between the nodes on the routing paths to be reliable. FIG. 10 shows the reception probability at different received signal strengths for Berkeley mica2dot motes. We can see that the reception probability is above 0.95 if the receive signal strength is above a certain value, which is −85 dB in this case. Therefore, for mica2dot platform, the nodes are considered to be neighbors if the received signal strength is above −85 dB at shortest range and interferers otherwise.

Figure 11:
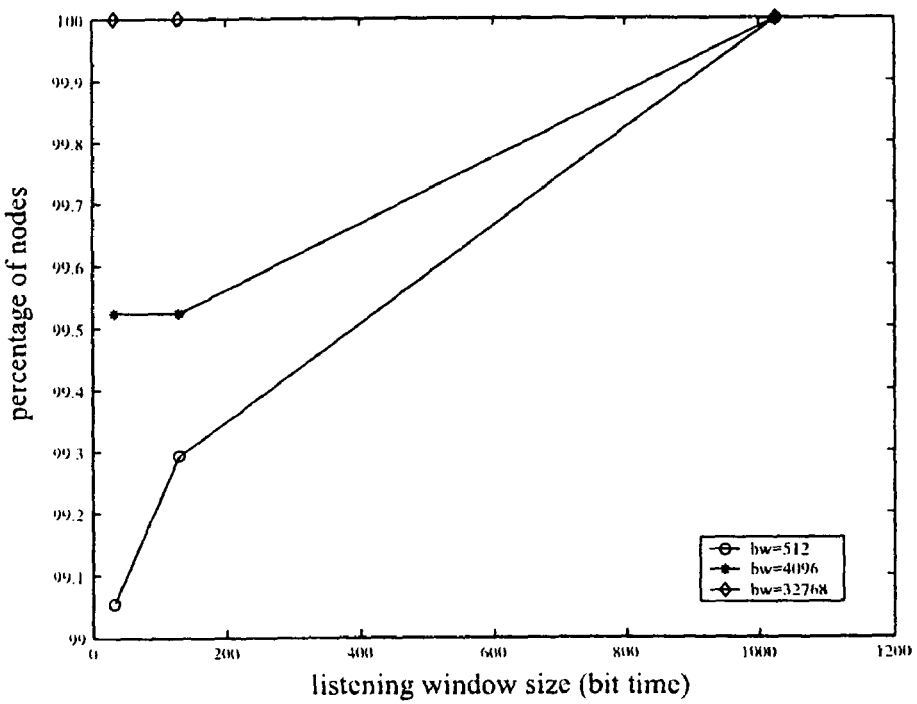
FIG. 11 is a graph showing the number of nodes reached by flooding as a percentage of the number of nodes that are theoretically reachable for 30 nodes.

FIG. 11 shows the percent of nodes that the tree construction packet reaches in flooding for different backoff and listening window sizes. All the nodes are reached if the backoff window size is large enough. Even with small window sizes, the tree construction packet reaches more than 99% of the nodes. This means the average number of neighbors, 5, is large enough such that if a node does not receive a flooding packet from one of its neighbors, it can still connect to AP via other neighbors.

Figure 12:
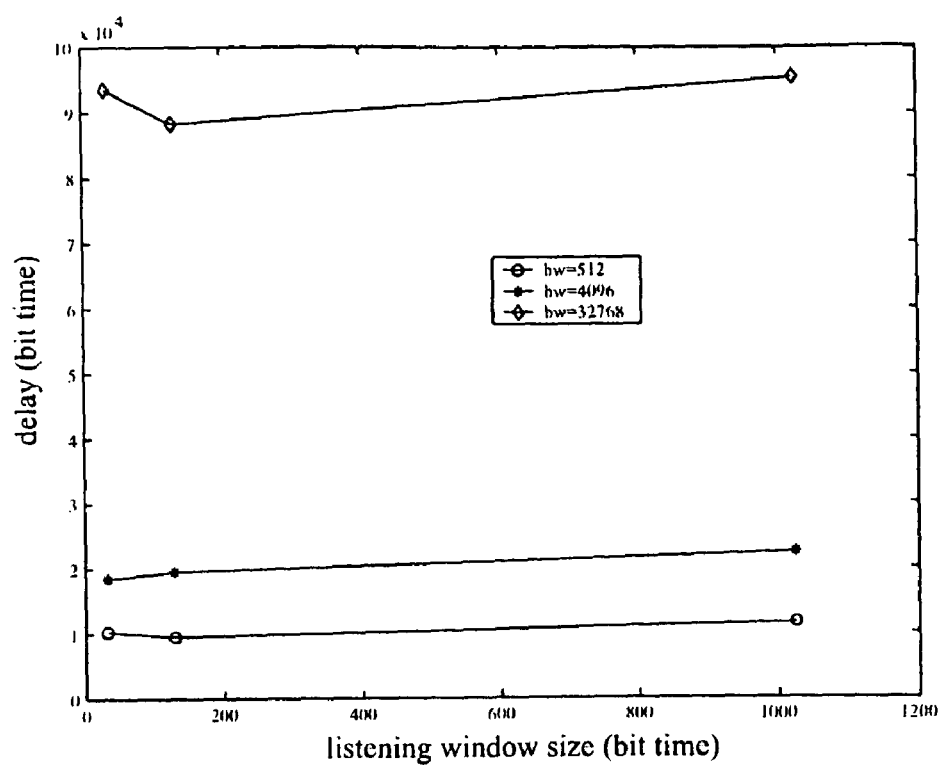
FIG. 12 is a graph of the maximum delay experienced by a tree construction packet for 30 nodes.

FIG. 12 may be used to explore the trade-off between increase in delay and increase in connectivity as the back-off and listening window sizes increase. Delay increases significantly with increasing backoff window size whereas it is almost constant regardless of the listening window size. The best flooding strategy therefore is to choose a small backoff window size and a large listening window size.

The random access scheme used in topology learning phase is associated with an acknowledgement for the topology collection phase to guarantee the successful arrival of all the packets in the network. Although the percent of successful arrival increases from 10% to 70% as the backoff window size increases, hidden nodes and bad channel conditions may prevent the successful delivery of all packets.

The acknowledgement schemes fall into one of two categories: implicit and explicit acknowledgement. For both schemes, we choose the backoff window size large enough to 'break' transmission synchronization and to enable the reception of 100% of nodes' packets at the AP.

Figure 13:
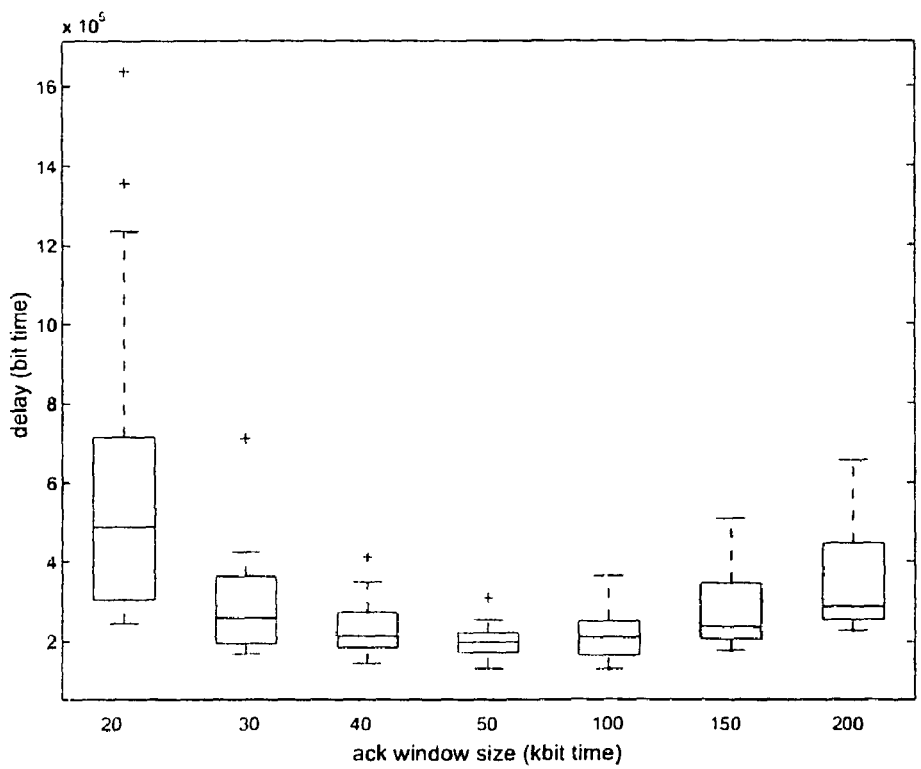
FIG. 13 is a graph of the delay of random access scheme with implicit acknowledgement for 30 nodes and different acknowledgement window sizes.

Implicit acknowledgement algorithm, referred to implicit random in figures, works as follows. When a node transmits a packet, it does not delete the packet from the transmit queue. When it receives a packet that is not broadcast or is not destined for itself, it checks whether it is one of the non-acked packets in the queue. If it is non-acked, the packets that are not acked and earlier in the FIFO queue are put to the end of the queue for retransmission. There is also a timeout after which all non-acked packets are placed at the end of the queue for retransmission. The size of this timeout, called acknowledgement window size, affects the delay experienced by the network as shown in FIG. 13. If the window size is chosen to be very small, the nodes will increase the load in the network by re-sending the packets even though these packets are still in the queue awaiting transmission. If the window size is too large, the nodes will wait for an unnecessarily long time. We assume that the system can adaptively adjust the acknowledgement window size to get the minimum delay point and use this value for comparison to other protocols.

Explicit acknowledgement algorithm, referred to IEEE 802.11 in figures, adopts RTS/CTS/DATA/ACK mechanism used in IEEE 802.11. RTS/CTS control packets of shorter length are used to acquire the channel before data packet transmission and include a duration field that indicates how long the remaining transmission will be. So if a node receives a control packet for another node, it puts its radio in sleep mode and does not transmit during this time. This is called virtual carrier sense. Physical carrier sense is performed at the physical layer by listening to the channel for a randomized carrier sense time, similar to the CSMA scheme described above. The backoff and listening window sizes are chosen to be the ratio of RTS control packet length to data packet length times those used in implicit acknowledgement scheme for a fair comparison.

Figure 16:
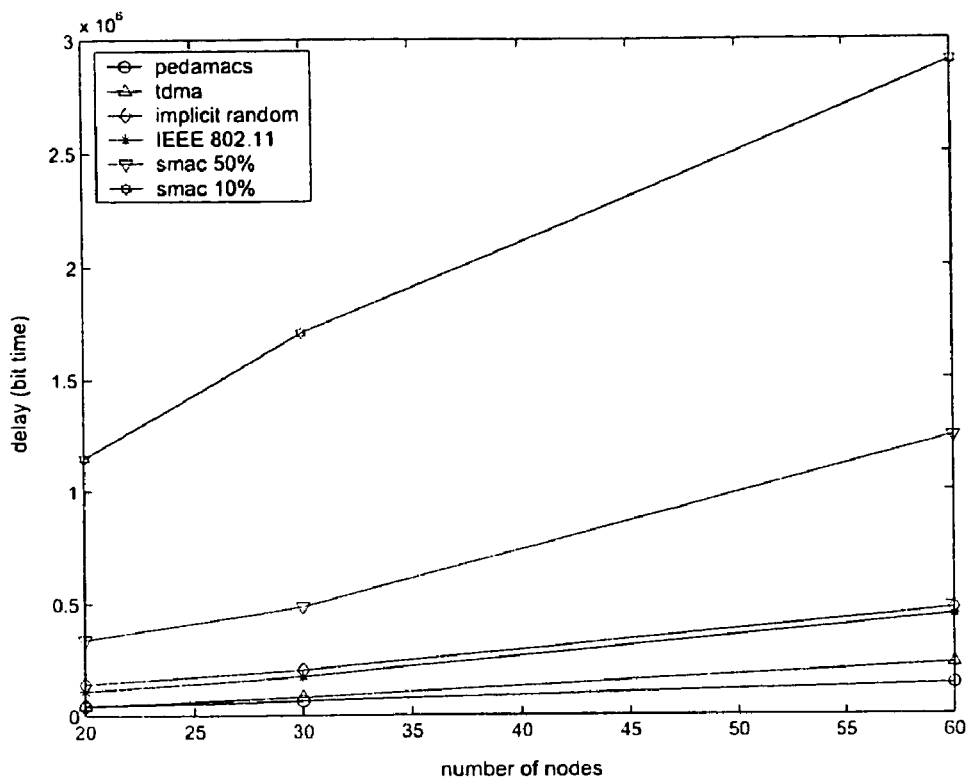
FIG. 16 is a graph showing a comparison of the delay of PEDAMACS with competing schemes for different number of nodes.
Figure 18:
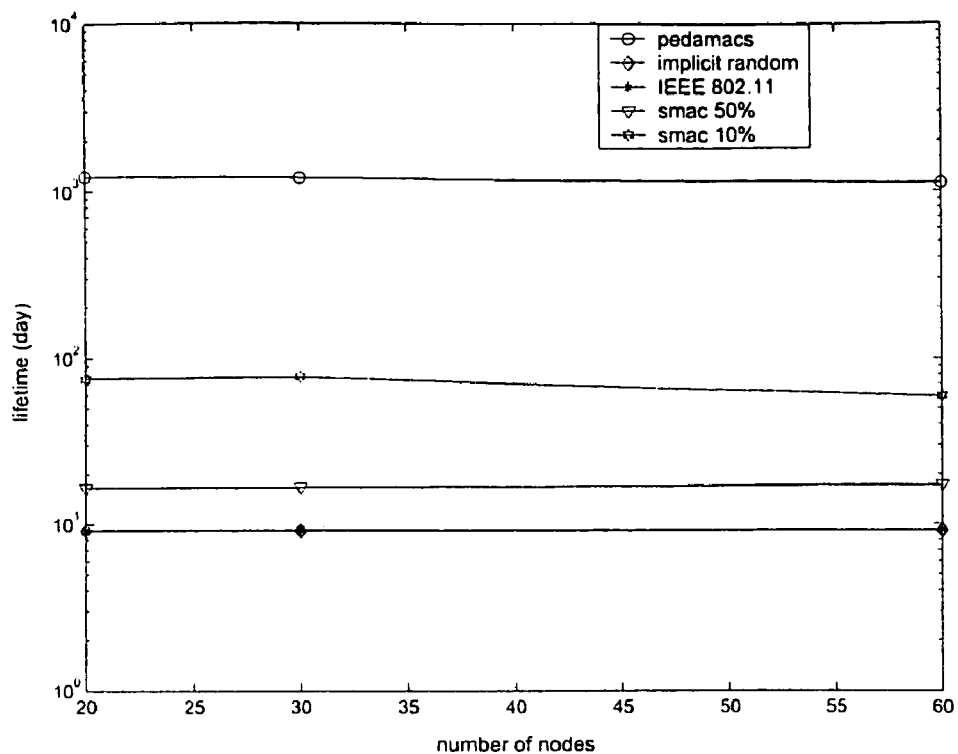
FIG. 18 is a graph showing a comparison of the lifetime of PEDAMACS with competing schemes for different number of nodes.
Figure 19:
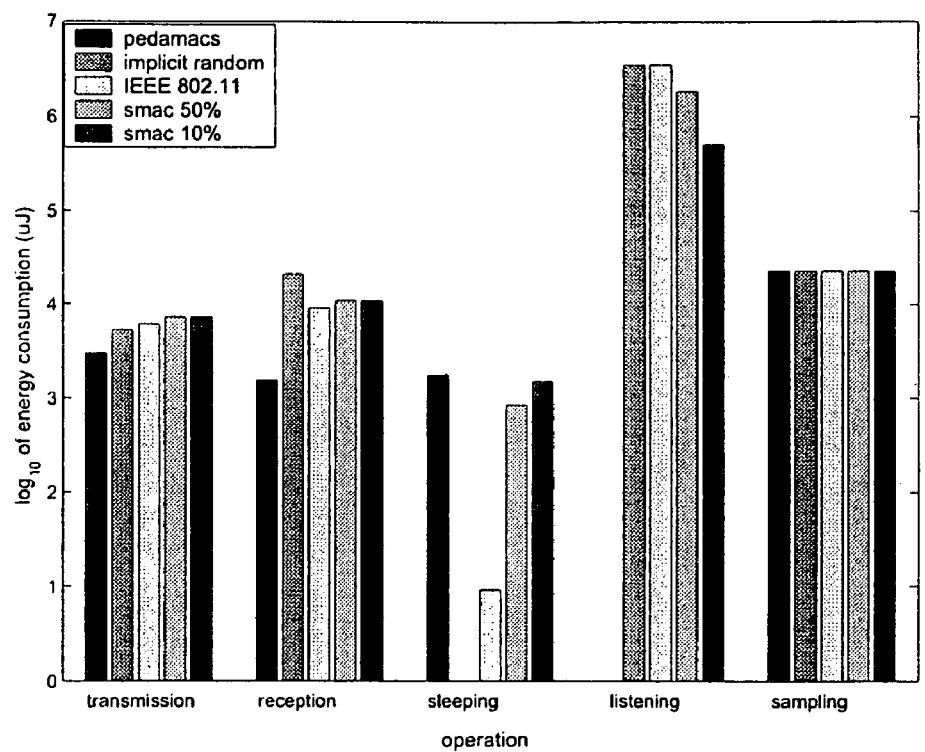
FIG. 19 is a graph showing a comparison of power consumption in a PEDAMACS network vs. contention networks for different node operations. Note that the vertical axis is $logic_{10}$.

FIG. 16 shows that the delay experienced by explicit acknowledgement is slightly smaller than that for the implicit acknowledgement scheme since the first knows immediately whether the transmission is successful whereas the latter has to wait for the acknowledgement window size. Also, FIG. 19 shows that the explicit acknowledgement scheme slightly reduces the energy consumption in listening and reception by putting the radio in sleep mode during neighboring nodes' transmissions while causing an increase in transmission energy through RTS/CTS/ACK control packets. The resulting lifetime shown in FIG. 18 is almost the same for both schemes. Therefore, the delay advantage of explicit acknowledgement scheme without requiring any adaptive scheme for acknowledgement window size adjustment makes it suitable for topology collection phase.

Random access schemes use flooding and collection to send packets to AP; PEDAMACS uses them to learn the network topology. Therefore, in PEDAMACS it is not enough for the nodes to be able to send packets to AP. The nodes must also hear from all of their neighbors in the topology learning phase to prevent scheduling of conflicting nodes in the same slot during the scheduling phase.

Incorrect topology information can be detected by AP by checking whether it receives packets from scheduled nodes. Since topology discovery is performed in the topology learning phase, the parameters affecting the average number of successfully scheduled nodes are backoff and listening window sizes.

Figure 14:
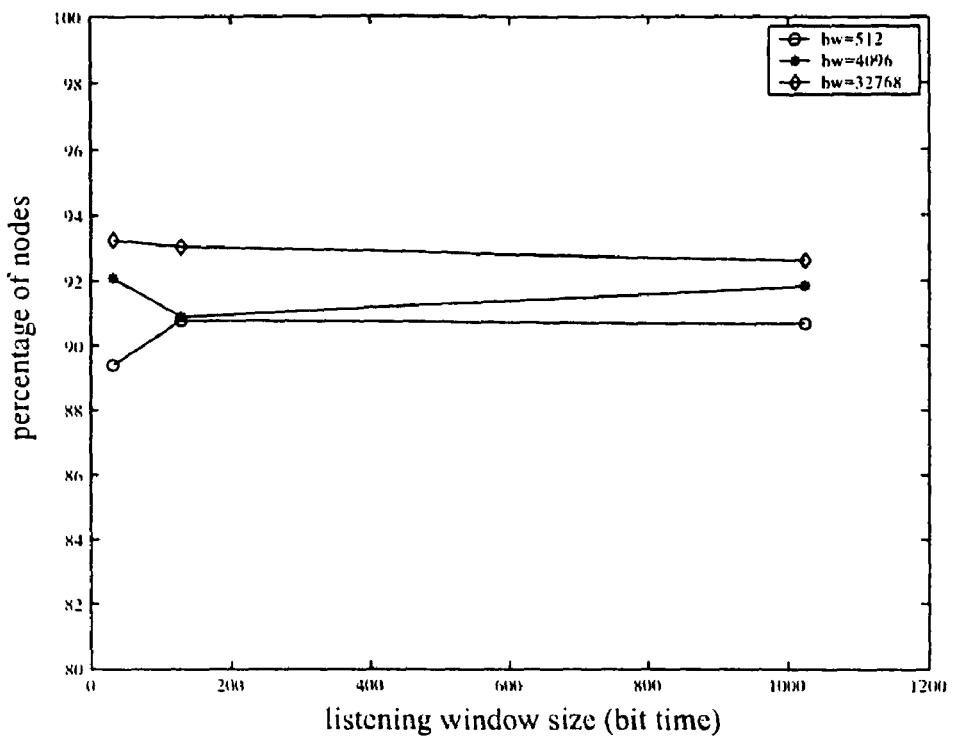
FIG. 14 is a graph of the number of successfully scheduled nodes as a percentage of the number of nodes reaching AP for 30 nodes.

FIG. 14 shows that the number of successfully scheduled nodes increases from 90% to 95% as backoff window size increases. This can be increased further by increasing the backoff window size enabling the nodes to hear from a larger number of their neighbors by increasing the number of successful transmissions. Another alternative is to start the adjustment phase to help the nodes learn about their remaining neighbors and interferers.

Figure 15:
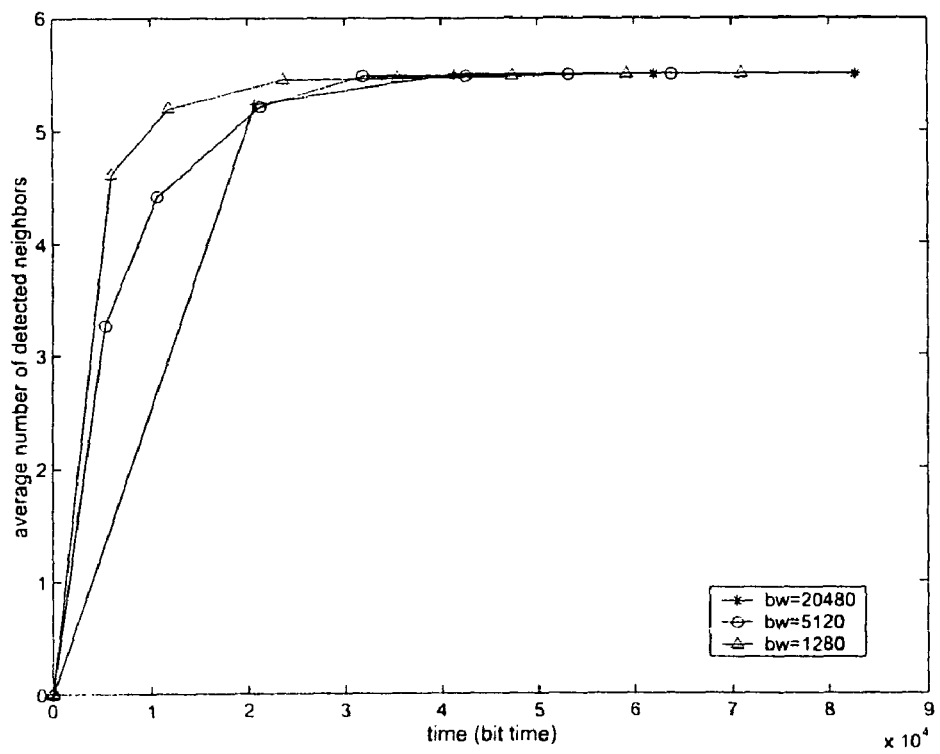
FIG. 15 is a graph of the average number of neighbors that are discovered as time evolves for different backoff window sizes corresponding to different adjustment phase lengths for a 60-node random network.

FIG. 15 shows the rate of detecting these neighbors from the start as a function of the time for consecutive adjustment phases. The time at which the nodes learn about all of their neighbors is almost independent of the backoff window size whereas the rate of increase is larger for smaller window size. The total time to discover the neighbors, which is 5.5 on average, is 40k-bit time that is less than 1 sec at 50 kbps.

We now provide a quantitative measure of improvement that PEDAMACS scheme provides over the existing schemes in terms of delay and energy consumption.

We have compared PEDAMACS with 5 existing schemes: implicit random, IEEE 802.11, SMAC 50%, SMAC 10% and TDMA. Implicit random and IEEE 802.11 refer to the random access schemes with implicit and explicit acknowledgements respectively described above. The only difference here is that they are used to send data packets instead of topology packets in random access networks.

SMAC is a MAC protocol specifically designed for energy efficiency of sensor networks. It provides low-duty cycle operation of each node by periodic sleeping. Although periodic sleeping trades latency for energy conservation, the adaptive listening reduces this cost by enabling each node to switch mode according to the traffic in the network. IEEE 802.11 is equivalent to SMAC without sleeping. We simulated SMAC for 50% and 10% duty cycles, denoting them by smac 50% and smac 10% in figures.

A TDMA scheme, denoted by tdma, is the PEDAMACS protocol based on the coloring of the original graph whereas pedamacs is the PEDAMACS protocol based on PEDAMACS scheduling.

FIG. 16 shows the delay comparison of PEDAMACS with existing protocols for different number of nodes. IEEE 802.11 provides slightly smaller delay compared to implicit random access schemes. SMAC increases the delay by a factor of 2-3 and 7-10 for 50% and 10% duty cycles respectively over the delay of IEEE 802.11. This factor decreases as the number of the nodes increases.

For a 60-node network the average delay of IEEE 802.11 scheme is nearly $5\times10^5$ bit times, which is about 10 sec for a 50 kbps transmission rate. Taking the random variation in the actual delay into account may make a random access scheme unsuitable for the traffic application, which generates data every 30 sec.

The delay experienced by PEDAMACS is slightly smaller than the TDMA scheduling algorithm. The difference between them increases as the number of nodes increases.

Figure 17:
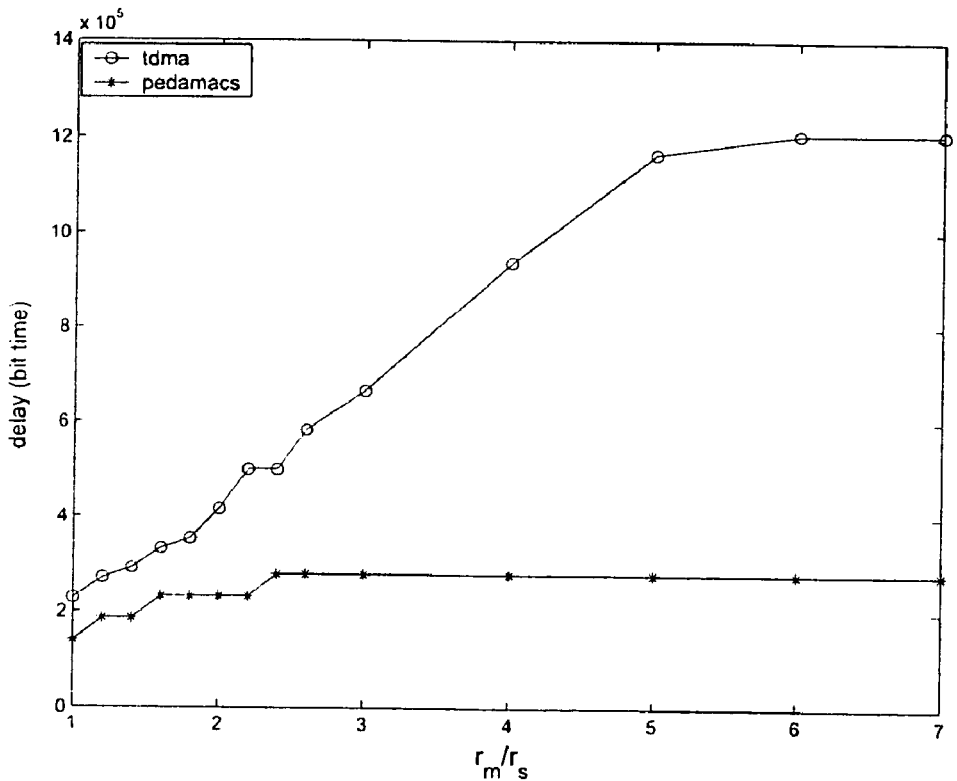
FIG. 17 is a graph showing a comparison of the delay of PEDAMACS with a TDMA scheme as a function of the ratio of medium transmission range to shortest range for a 60-node random network.

We also examine the relation of delay to the interference range of the nodes for TDMA and PEDAMACS schemes. FIG. 17 shows the effect of the $r_m/r_s$ ratio on the delay for a 60-node random network. As the interference range increases, the delay of TDMA schedule increases much more significantly than that of PEDAMACS schedule. This is because the length of PEDAMACS schedule is proportional to the number of colors used for a linear network compared to the whole network in TDMA schemes.

The power-consuming operations in a sensor node are transmission and reception of a packet, listening to the channel, sampling, and running the microprocessor. Table 1 gives power consumption figures for the Berkeley mica nodes.

TABLE 1

Power consumptions of basic operations in Berkeley mica nodes.

| operation | power consumption |
| --- | --- |
| transmitting one packet | 0.92 mJ |
| receiving one packet | 0.69 mJ |
| listening to channel | 29.71 mJ/sec |
| operating radio in sleep mode | 15 µJ/sec |
| sampling sensor | 1.5 µJ/sample |

The network lifetime is estimated from the average energy consumed between two consecutive packet generations of the nodes and the packet generation period at each node, assuming a 50 kbps transmission rate and the use of a pair of AA batteries, which can supply 2200 mAh at 3V, at each node. A better estimate of the lifetime for a specific application can be performed by considering the routing protocol and the communication between the nodes upon the death of a node.

FIG. 18 gives the lifetime estimates of PEDAMACS and existing protocols for 128 Hz sampling rate at each node. We have chosen 2-minute packet generation period in order to guarantee the successful arrival of packets within the period (Maximum delay in FIG. 16 is $3*10^6$ bit time, which is equivalent to 60sec at 50 kbps, for 60-node smac 10%).

The lifetime of random access schemes, implicit random and IEEE 802.11, is about ten days whereas the lifetime of SMAC protocol increases up to 60 days for 10% duty cycle. The lifetime of PEDAMACS system, on the other hand, is about 1200 days. The reason for the dramatic difference becomes clear from FIG. 19, which compares the power consumed by these schemes in different operations for a 60-node random network. The primary cause is in the total energy consumed by the radio in 'listening' and 'sleeping' modes. SMAC 10% can decrease this energy by a factor of 10 whereas PEDAMACS decreases it by a factor of more than 1,000.

The difference in lifetimes also arises from differences in the amount of energy spent in transmission and reception. The reason of extra transmission energy spent in implicit random over PEDAMACS is retransmission as a result of collision. IEEE 802.11 spends even more energy in transmission for RTS, CTS and ACK control packets. SMAC 50% and 10% adds the energy spent in the transmission of synchronization messages to that of IEEE 802.11.

The average receive energy differs because of the 'over-hearing effect': In random access schemes, when one node transmits a packet, all neighboring nodes receive it whereas only the parent of that node receives the packet in PEDAMACS (the other neighbors are in sleep mode). The difference is largest for implicit random since the neighboring nodes listen to whole packets whereas IEEE 802.11 and SMAC slightly eliminates it by transmitting shorter RTS/CTS packets.

The lifetime estimate of PEDAMACS in the simulation is based on the assumption that the time spent for topology discovery is negligible compared to the time spent in scheduling phase. The ratio of rescheduling—induced by sensor movement, link fluctuations—PEDAMACS can tolerate before it loses its advantage in energy savings over SMAC 50% is calculated to be 53% percent of the total time, that is equivalent to taking data and topology information for one period by using IEEE 802.11 and using PEDAMACS schedule in the next period.

FIG. 18 is for a network with a 50 kbps rate and a 2-minute packet generation period. If the rate decreases, the delay experienced will increase in inverse proportion. However, the energy consumption per bit may decrease or increase depending on the hardware. For RFM TR1000, the radio used in the Berkeley nodes, the energy per bit increases as the rate decreases because the same current is drawn at the same voltage for a longer time. But with most coding schemes, the energy consumed decreases as the rate decreases. Therefore, it is possible to decrease the energy consumption per packet by decreasing the rate. Furthermore, energy consumed in listening to the channel and sampling is constant for different rates.

In some applications the sensor sampling rate would be higher, e.g. 10 kHz. Energy consumed in sampling may then increase significantly, necessitating sensor and sampling schemes that consume less power.

Figure 20:
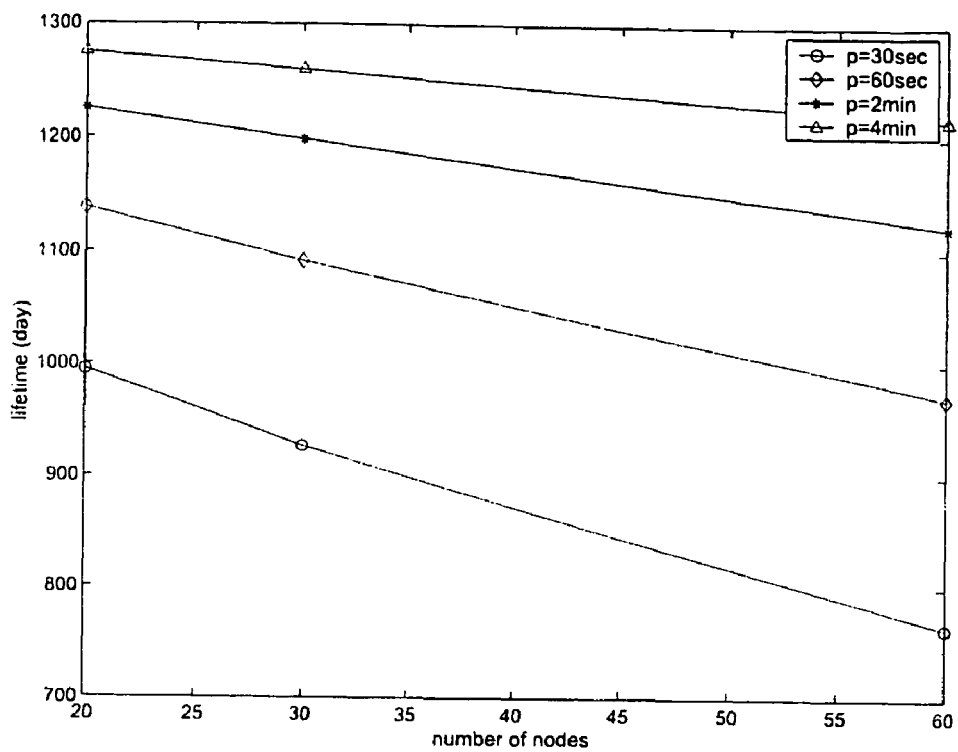
FIG. 20 is a graph showing the lifetime of PEDAMACS network for different packet generation periods and different number of nodes.

As the packet generation period decreases, some of these schemes may not suitable because of their delay characteristics. The lifetime of PEDAMACS is given in FIG. 20 for different packet generation rates at 128 Hz sampling rate. As the packet generation period decreases, the slope of the decrease in the lifetime as a function of the number of nodes is much sharper because of the decreasing dominating effect of listening energy over the transmit and reception energy.

Traditional TDMA schemes are based on the assumption that the nodes interfering with a receiver are within its transmission range, which is called shortest range in this paper. However, the power needed for interrupting a packet reception is much lower than that of delivering a packet successfully. This section shows the necessity of considering the interferers within larger range, which is named medium range here. In simulations, we assume that the receiving signal power is inverse proportional to $d^4$, where d is the distance between transmitter and receiver, and ignore the thermal noise since it is much smaller than interference signal.

Figure 21:
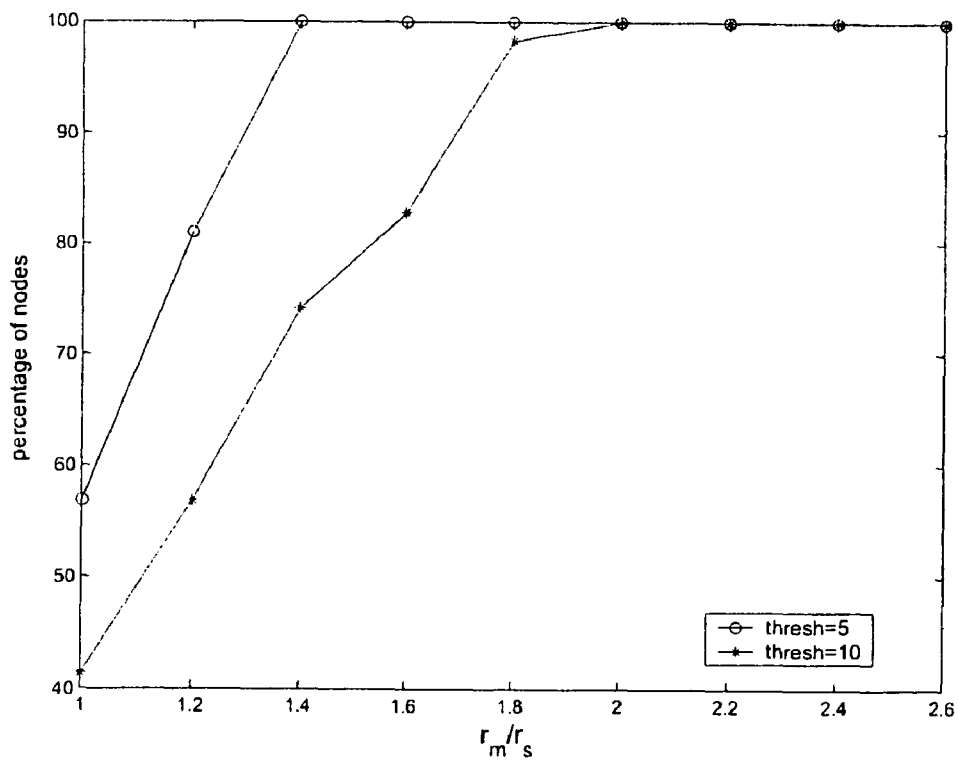
FIG. 21 is a graph showing the number of nodes whose packets successfully arrive AP as a percentage of the number of nodes that are scheduled for a 60-node random network.

FIG. 21 examines the number of packets successfully received at the access point as a function of the $r_m$ to $r_s$ ratio for a 60-node random network. The reception of packets with a SINR value smaller than threshold, which is called 'thresh' in the graph, is considered not to be successful. As the ratio of $r_m$ to $r_s$ increases, the number of successfully received packets increases. The value of the ratio for which all transmissions are successful is 2 for this case, where the nodes are randomly distributed and the average number of neighbors at shortest range is 5.5. As the density increases, the graph is expected to shift to the right.

In sensor networks, measurements made at the nodes must be transferred to a distinguished node, which we call an access point (AP). The MAC protocol for a sensor network is decisive in determining network performance in terms of power consumption and total delay.

We consider a special class of sensor networks with two distinguishing characteristics. First, AP has unlimited power so that packets broadcast by AP can reach all other nodes in one hop, whereas packets from the latter must travel over several hops to reach AP. Second, the nodes periodically generate packets. These two characteristics are exploited by the PEDAMACS protocol to schedule transmissions while providing the synchronization of the nodes, the discovery of the routing paths and the determination of the interferers beyond the transmission range in an energy efficient manner.

For the application considered here, the PEDAMACS network provides a lifetime of several years compared to several months and days based on random access schemes with and without sleep cycles respectively. In the future, we plan to focus on developing a more elaborate interference model that excludes a subset of nodes inside the interference range from the set of interferers while guaranteeing a SINR above the threshold at each node, sending packets over multiple paths or using redundancy in the data to combat the unstable links and further increasing the lifetime of the system via redundant nodes.

There has been described a power efficient wireless system for a sensor network. While the invention has been described with reference to specific embodiments, the description is illustrative of the invention and not limiting the invention. Various applications and modifications, as noted above, may occur to those skilled in the art without departing from the true spirit and scope of the invention as defined by the appended claims.

What is claimed is:

1. A power efficient wireless system for a sensor network comprising:
   a) at least one access point including a processor and a transceiver configured to transmit signals to and receiving signals from a plurality of sensor nodes,
   b) a plurality of sensor nodes each including a processor and a transceiver configured to receive signals from the access point and transmitting data packets to the access point, and
   c) a communication network including wireless one hop broadcast of downlink signals from the access point to the plurality of sensor nodes, wherein the downlink signals are broadcast by the access point using a transmission power having a range covering the plurality of sensor nodes, and multi-hop transmission of at least some uplink signals that originate from the plurality of sensor nodes to the access point through a plurality of channels using time division multiple access and assigned to the sensor nodes by the access point using a scheduling mechanism, wherein the at least some uplink signals are transmitted by the plurality of sensor nodes using another transmission power having a range covering each sensors' neighboring nodes, and further wherein the transmission power used by the access point to broadcast downlink signals is higher than the transmission power used by the plurality of sensor nodes to transmit the at least some uplink signals.

2. The system as defined by claim 1 wherein said communication network includes a carrier sense multiple access mode for sensor nodes responding to the access point with neighbor and interferer information in response to a starting topology communication from the access point.

3. The system as defined by claim 2 wherein the starting topology communication includes a tree construction packet, the sensor nodes determining neighbors and interferers based on the tree construction packet, and the parent node based on lowest cost to the access point.

4. The system as defined by claim 3 wherein the access points staffs a topology collection phase by transmitting a coordination packet to the plurality of sensor nodes in one hop, the sensor nodes then sending neighbor and interferer information using carrier sense multiple access protocol.

5. The system as defined by claim 4 wherein the access point responds to neighbor and interferer information from the plurality of sensor nodes by scheduling assigned channels and transmission time to the plurality of sensor nodes.

6. The system as defined by claim 4 wherein the access point transforms the original sensor node network into a linear network, colors nodes the same color from a maximal independent set of the linear network, and schedules links of the original network based on coloring of the linear network.

7. A power efficient wireless system for a sensor network comprising:
  a) a plurality of sensor nodes each including a transceiver,
  b) at least one access point including a transceiver for transmitting signals to and receiving signals from the plurality of sensors,
  c) a communication network for communication between the sensor nodes and the access point, wherein the access point determines a communication schedule for the sensor using time division multiple access uplink channels from the sensors to the access point based on neighbor and interferer information received from each sensor node,
  wherein the access point initially transmits a coordination packet and a tree construction packet to all of the plurality of sensor nodes, wherein the access point transmits the coordination packet to the plurality of sensor nodes in one hop using a transmission power having a range covering the plurality of sensor nodes,
  the sensor nodes responding using carrier sensing multiple access to communicate neighbor and interferer information to the access point, at least some sensor nodes responding via multi-hop communications originating from said at least some sensor nodes, wherein the sensor nodes transmit neighbor and interferer information using another transmission power a range covering each sensors' neighboring nodes, and
  further wherein the transmission power used by the access point to transmit the coordination packet is higher than the transmission power used by the sensor nodes to transmit neighbor and interferer information.

8. The system as defined by claim 7 wherein the sensor nodes are traffic sensors.

9. The system as defined by claim 8 wherein the traffic sensors are acoustic.

10. The system as defined by claim 8 wherein the traffic sensors are magnetic.

11. The system as defined by claim 7 wherein the sensor nodes are parking sensors.

12. The power efficient wireless system of claim 7, wherein the access point has more power than at least some of the sensors nodes.

13. A method of controlling a wireless system for communicating between a plurality of sensor nodes each including a sensor, a processor, and a transceiver and an access point including a processor and a transceiver having more power than each of the sensor nodes, said method comprising:
  a) the access point transmitting in one hop to all of the plurality of sensor nodes a coordination packet and a tree construction packet, wherein the access point transmits the coordination packet using a transmission power having a range covering the plurality of sensor nodes;
  b) each sensor node responding to the access point using carrier sense multiple access with neighbor and interferer information, wherein at least one sensor node responds via multi-hop communication originating from said at least one sensor node, wherein the sensor nodes transmit neighbor and interferer information using another transmission power having a range covering each sensors' neighboring nodes and further wherein the transmission power used by the access point to transmit the coordination packet is higher than the transmission power used by the sensor nodes to transmit neighbor and interferer information; and
  c) said access point responding to received neighbor and interferer information by assigning time division multiple access channels to the sensor nodes whereby the sensor nodes have a sleep mode except during the assigned time division channel.

14. The method of claim 13 wherein the access point responds to neighbor and interferer information from the plurality of sensor nodes by scheduling assigned channels and transmission time to the plurality of sensor nodes.

15. The method of claim 14 wherein the access point transforms the original sensor node network into a linear network, colors nodes a same color from a maximal independent set of the linear network, and schedules links of the original network based on coloring of the linear network.

16. A traffic control radio communication system comprising:
  a) a plurality of nodes each including a vehicle detection sensor,
  b) an access point coupled to the plurality of nodes for gathering information on the node network and broadcasting periodic schedules to the nodes for listening, transmitting data using a carrier sense multiple access (CSMA) protocol, and sleeping, and
  c) a communication link of the plurality of nodes to the access point, including wireless one hop broadcast of downlink signals from the access point to the plurality of nodes, wherein the downlink signals are broadcast by the access point using a transmission power having a range covering the plurality of nodes; and multi-hop transmission of at least some uplink signals that originate from the plurality of nodes to the access point, wherein the at least some uplink signals are transmitted by the plurality of nodes using another transmission power having a range covering each nodes' neighboring nodes, further wherein the transmission power used by the access point to broadcast downlink signals is higher than the transmission power used by the plurality of nodes to transmit the at least some uplink signals.

17. The traffic control radio communication system as defined by claim 16 wherein the communication link uses time division multiple access (TDMA) for defining communication channels.

18. The traffic control radio communication system as defined by claim 16 wherein the vehicle detection sensor is magnetic.

19. The traffic control radio communication system as defined by claim 16 wherein the vehicle detection sensor is acoustic.

* * * * *